United States Patent
Söderlind et al.

(10) Patent No.: US 11,483,200 B2
(45) Date of Patent: *Oct. 25, 2022

(54) METHODS AND SYSTEMS FOR PROVISIONING SETTINGS OF A MEDIA PLAYBACK DEVICE

(71) Applicant: Spotify AB, Stockholm (SE)

(72) Inventors: Nicklas Söderlind, Stockholm (SE); Jimmy Wahlberg, Uppsala (SE)

(73) Assignee: Spotify AB, Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 16/397,378

(22) Filed: Apr. 29, 2019

(65) Prior Publication Data
US 2019/0327139 A1    Oct. 24, 2019

Related U.S. Application Data

(63) Continuation of application No. 15/958,154, filed on Apr. 20, 2018, now Pat. No. 10,367,687.

(51) Int. Cl.
| | |
|---|---|
| G06F 15/177 | (2006.01) |
| H04L 41/0806 | (2022.01) |
| H04L 41/08 | (2022.01) |
| H04L 67/306 | (2022.01) |
| G06Q 10/08 | (2012.01) |
| H04L 65/1063 | (2022.01) |
| G06Q 30/06 | (2012.01) |

(Continued)

(52) U.S. Cl.
CPC ....... *H04L 41/0809* (2013.01); *G06Q 10/083* (2013.01); *G06Q 30/0633* (2013.01); *H04L 41/0886* (2013.01); *H04L 65/1059* (2013.01); *H04L 65/1063* (2013.01); *H04L 65/612* (2022.05); *H04L 67/306* (2013.01)

(58) Field of Classification Search
CPC ............. H04L 41/0809; H04L 41/0886; H04L 67/306; H04L 65/1059
USPC ....................................................... 709/222
See application file for complete search history.

(56) References Cited

U.S. PATENT DOCUMENTS

| | | | | |
|---|---|---|---|---|
| 5,583,873 | A | * 12/1996 | Miyake | ................ H04H 20/28 370/527 |
| 2002/0046084 | A1 | 4/2002 | Steele et al. | |

(Continued)

FOREIGN PATENT DOCUMENTS

| | | | |
|---|---|---|---|
| EP | 1137210 A2 | 9/2001 | |
| WO | WO-2010087748 A1 | * 8/2010 | ......... H04L 12/2809 |

OTHER PUBLICATIONS

"JVC Smart Music Control," JVC (Jan. 13, 2014). Available at: http://www.jvc.net/car/app/jsmc/.

*Primary Examiner* — Hee Soo Kim
(74) *Attorney, Agent, or Firm* — Merchant & Gould P.C.

(57) ABSTRACT

A system is provided for streaming media content in a vehicle. The system includes a personal media streaming appliance system configured to connect to a media delivery system and receive media content from the media delivery system at least via a cellular network. The media delivery system is configured to link a user media streaming account with a particular personal media streaming appliance to provide personalized media content to the appliance. Media contexts are assigned to multiple preset settings automatically so that the personal media streaming appliance system is configured to output personalized media content upon first use.

24 Claims, 16 Drawing Sheets

(51) Int. Cl.
*H04L 65/1059* (2022.01)
*H04L 65/612* (2022.01)

(56) References Cited

U.S. PATENT DOCUMENTS

| | | |
|---|---|---|
| 2005/0086328 A1* | 4/2005 | Landram ................. H04L 67/34 |
| | | 709/228 |
| 2009/0164473 A1 | 6/2009 | Bauer |
| 2010/0077094 A1 | 3/2010 | Howarter et al. |
| 2010/0312369 A1 | 12/2010 | Dollar, Jr. |
| 2010/0315200 A1 | 12/2010 | Warrier |
| 2011/0138280 A1* | 6/2011 | Nagara ................. G11B 27/034 |
| | | 715/716 |
| 2012/0324046 A1 | 12/2012 | Park |
| 2014/0006483 A1* | 1/2014 | Garmark ............. H04L 65/1093 |
| | | 709/203 |
| 2014/0258481 A1* | 9/2014 | Lundell ................. H04L 67/306 |
| | | 709/222 |
| 2016/0197967 A1 | 7/2016 | Kreifeldt et al. |
| 2016/0330567 A1* | 11/2016 | Raleigh ............... H04L 63/0853 |
| 2018/0173489 A1* | 6/2018 | Gomes-Casseres ......................... H04N 21/485 |

* cited by examiner

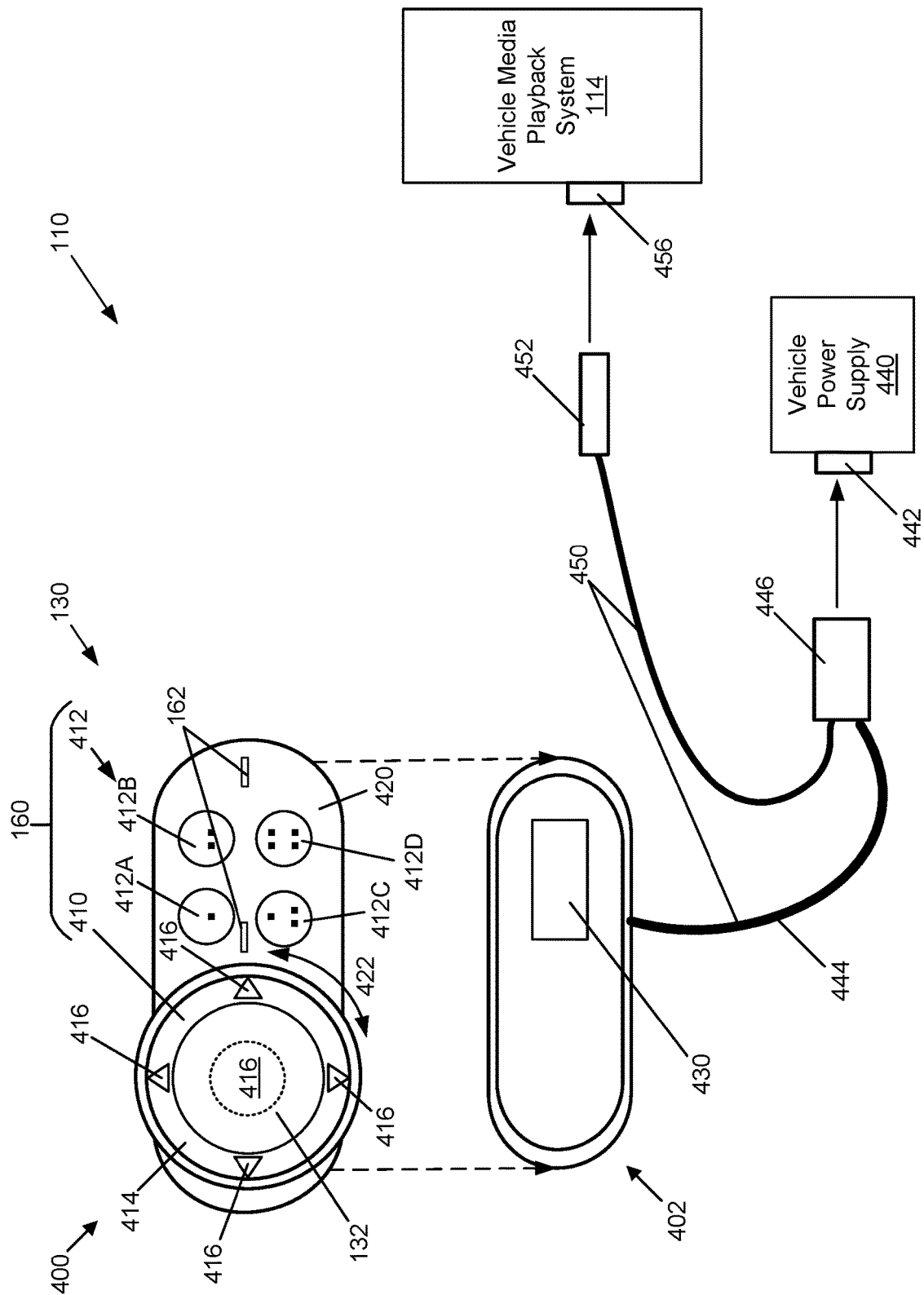

METHODS AND SYSTEMS FOR PROVISIONING SETTINGS OF A MEDIA PLAYBACK DEVICE

CROSS-REFERENCE TO RELATED APPLICATIONS

This application is a Continuation application of U.S. application Ser. No. 15/968,154, filed Apr. 20, 2018, now U.S. Pat. No. 10,367,687, issued Jul. 30, 2019, which is incorporated by reference herein in its entirety.

BACKGROUND

Many people enjoy consuming media content while travelling or during other activities. When driving, for example, drivers and passengers listen to audio content, such as songs, albums, podcasts, audiobooks, and other types of audible content from devices that are built into the vehicle such as terrestrial and satellite radios and fixed media players that can playback media content stored on CDs, USB drives, or SD cards. Some vehicles have internet access and can stream or download media content.

Alternatively, a mobile device, such as a smartphone or a tablet running music streaming applications can be used. However, mobile devices are not well suited for a vehicle environment for various reasons, such as legal restrictions and sophisticated user interfaces that are not convenient for use in a vehicle.

Typical media content services, devices, and applications for providing media content require multiple steps to prepare an account associated with the media content service, the device, and application in order to provide personalized media content to a user. For example, it is common for users to be required to log into their device, establish wireless connections, and/or log into their account. Preferences have to be set by the user to provide a personalized media content experience. Even once a device is logged into a music streaming service, at least the initial use of the service is not completely personalized for the user.

Many users desire a personalized media consuming experience. For example, a user can access almost limitless catalogs of media content through various free or fee-based media delivery services, such as media streaming services. Users can use mobile devices or other media playback devices to access large catalogs of media content. Due to such large collections of media content, it is desired to make it possible to customize a selection of media content to match users' individual tastes and preferences so that users can consume their favorite media content while traveling in a vehicle.

Many vehicles include a built-in media playback device, such as a radio or a fixed media player, such as a player that can play media content from a CD, USB drives, or SD cards. However, the media content that is delivered using these built in vehicle media playback devices is greatly limited and is not flexible or customizable to the user.

Alternatively, a mobile device, such as a smartphone or a tablet, can be used by a user to enjoy a personalized and flexible music consuming experience in a vehicle by running music streaming applications thereon. However, the music streaming application is not automatically ready to run and play media content, and the user needs to pick up the mobile device and open the music streaming application and control a sophisticated user interface to play media content.

One technical challenge associated with providing personalized media content to a device in a vehicle is provisioning the device. Users typically need to provide one or more inputs to a new media streaming device or application in order for personalized content to be played by the device or application.

US 2002/0046084 describes an internet radio device for portable applications and uses such as in an automobile. The internet radio device is configured by a user after purchase using a remote computer with an internet connection. The device accesses the internet to receive updates to configurations.

US 2010/0077094 describes a system and method for updating media content in a vehicle. Media content is received through a home network and is stored on a device in the vehicle. The media content can be updated using an application operated by a user.

No technical solution has been found to the problem of provisioning a media playback device while it is within the supply chain channel prior to delivery.

There exists a need for a media playback system that is provisioned at the early stages of the supply chain so that upon arrival it is provisioned for use and control of personalized media content playback.

SUMMARY

In general terms, the present disclosure relates to provisioning of a personal media streaming appliance. In one possible configuration and by non-limiting example, the personal media streaming appliance is set up to play personalized media content upon first use of the appliance without additional input from a user. Various aspects are described in this disclosure, which include, but are not limited to, the following aspects.

One aspect is a method for customizing a personal media streaming appliance (PMSA). A media delivery system receives a user account identifier associated with a user media streaming account. The media delivery system also receives an appliance identifier associated with the PMSA. The user account identifier and appliance identifier are linked together. One or more media contexts are assigned to settings of the PMSA. At least one of the settings is associated with a preset button the PMSA. A preset signal is received at the media delivery system from the PMSA. The preset signal includes at least a preset button identifier and a user account identifier. The media delivery system retrieves media content matching a media context assigned to the setting associated with the preset button corresponding to the preset button identifier. The media content is communicated to the PMSA for playback.

Another aspect is a system for providing personalized media content to a PMSA. The system includes a media delivery system. The media delivery system includes a media content server having a processing device, a memory device, and a media server application. The media server application is configured to provide a media streaming service. The media delivery system further includes a personal media streaming appliance server having a processing device, a memory device, and a personal media streaming appliance configuration engine. The personal media streaming appliance configuration engine is configured to link a user media streaming account to a PMSA and determine personalized content to provide to the PMSA upon first use.

BRIEF DESCRIPTION OF THE DRAWINGS

FIG. 6 schematically illustrates an example embodiment of the PMSA system of FIG. 1.

DETAILED DESCRIPTION

Figure 1:
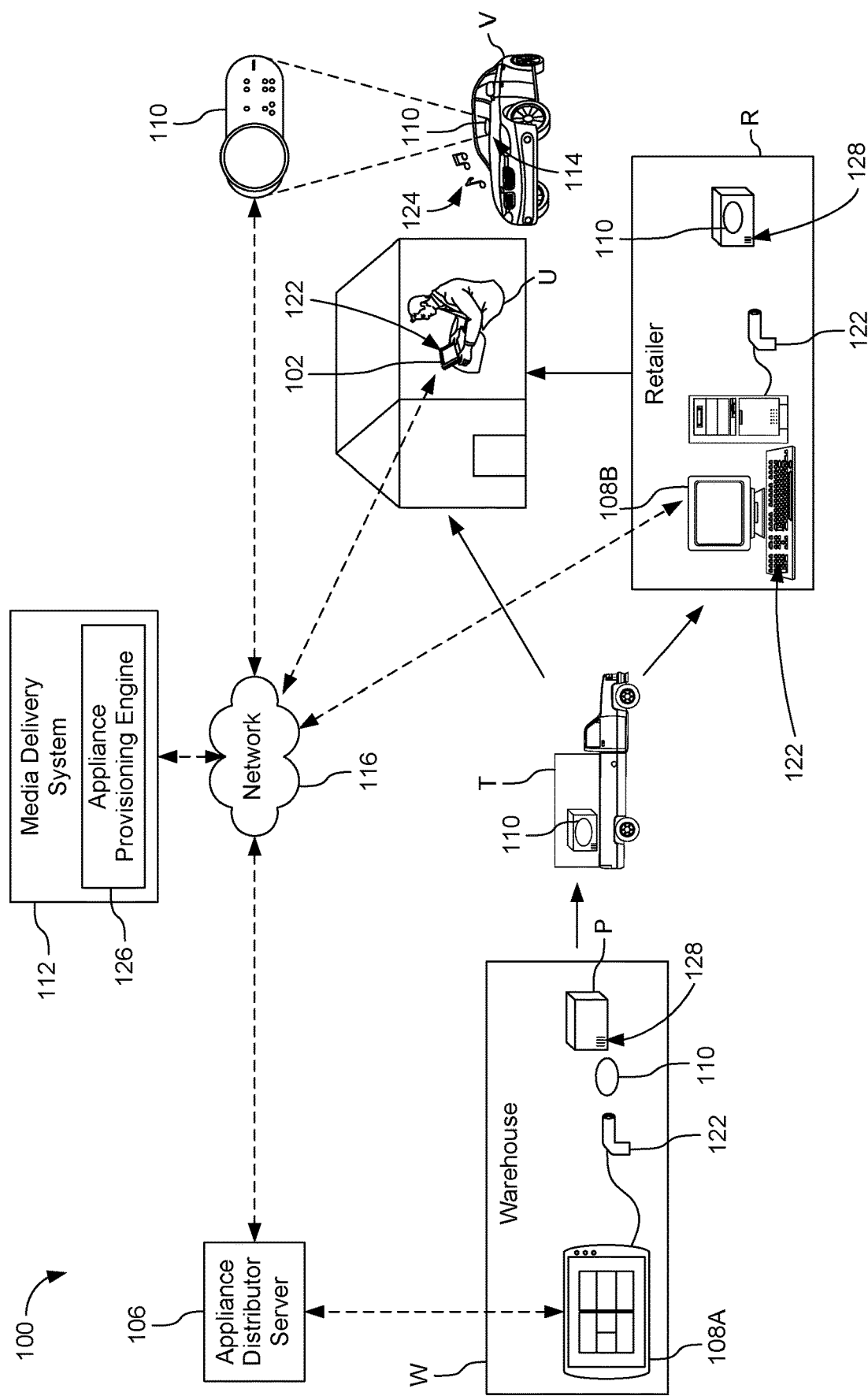
FIG. 1 illustrates an example system for provisioning settings of a personal media streaming appliance (PMSA) system.

Various embodiments will be described in detail with reference to the drawings, wherein like reference numerals represent like parts and assemblies throughout the several views.

As used herein, the term "media content" refers to audio content, video content, and combinations thereof. Examples of audio content include songs, albums, playlists, radio stations, podcasts, audiobooks, and other audible media content items. Examples of video content include movies, music videos, television programs, and other visible media content items. In many cases, video content also includes audio content.

As used herein, the term "vehicle" can be any machine that is operable to transport people or cargo. Vehicles can be motorized or non-motorized. Vehicles can be for public or private transport. Examples of vehicles include motor vehicles (e.g., cars, trucks, buses, motorcycles), rail vehicles (e.g., trains, trams), tracked vehicles, watercraft (e.g., ships, boats), aircraft, human-powered vehicles (e.g., bicycles), wagons, and other transportation means.

A user can drive a vehicle or ride as a passenger for travelling. As used herein, the term "travel" and variants thereof refers to any activity in which a user is in transit between two locations.

As used herein, the term "provisioning" refers to a process in which a device is prepared for operation by a user. Provisioning can include steps such as building the device, installing software on the device, establishing connections with networks, and setting up user access. In some instances, provisioning can include setting up user preferences and settings for the device.

The present disclosure generally relates to providing a personal media streaming appliance (PMSA) system 110 that is personalized to a particular user at the time the user first uses the PMSA. A media streaming account of the user is associated with the PMSA 110 before the first operation of the PMSA 110 to play media content. The user account 240 provides information about the user's preferences for consuming media content. The user account 240 stores assignments of particular contexts of media content with controls on the PMSA 110. This setup provides the PMSA 110 with media content to play that the user is likely to enjoy.

A media delivery system 112 associates the user's media streaming account 240 with the PMSA 110. This occurs before the PMSA 110 receives any inputs to play media content. In some embodiments, the PMSA 110 is provisioned with a particular user's media streaming account before the PMSA 110 is first operated to play media content.

Preset settings are automatically generated for each PMSA 110 based on the associated user account 240. For example, preset buttons 412 on the PMSA 110 can be assigned media contexts that are selected based on a taste profile 242 associated with a user's media streaming account. One example of a taste profile 242 provides a history of the user's media consumption. Media content is selected that is similar to media content that is in the history of the user's media streaming account.

In one embodiment, a user computing device 102 receives an input to log into the media streaming account. The media streaming account is associated with a user operating the user computing device 102. The user computing device 102 then receives input to place an order for a PMSA 110 to be delivered to an address of the user. The user computing device 102 communicates the order to the media delivery system 112. The media delivery system 112 records this order. The order is recorded by linking an order identifier (typically a number or other series of characters) with an account identifier associated with the user's account 240 (e.g. a unique account ID number or username).

The media delivery system 112 can then submit a request to a vendor to fulfill the order. In some instances, the media delivery system 112 collects multiple orders for PMSA's and submits one request for multiple appliances to the vendor manufacturer. The request includes at least an order number for each PMSA.

The manufacturer vendor records a unique appliance identifier 128 after the PMSA 110 is ready to ship. A vendor computing device 108 submits that appliance identifier 128 to the media delivery system 112. The appliance identifier 128 can be a number or other series of characters. The appliance identifier 128 can be recorded by scanning a barcode or QR code. The appliance identifier 128 is submitted along with its corresponding order number to the media delivery system 112.

Upon receiving the appliance identifier 128, the media delivery system 112 matches the order identifier with the account identifier. The appliance identifier 128 corresponding to the order identifier is then linked to the account identifier in the user's account 240. The device identifier is stored in a table along with the account identifier.

In another embodiment, a user can purchase a PMSA 110 from a retailer. In this example, the user account is associated with the PMSA 110 at the time of purchase. The PMSA 110 still receives personalized settings by linking to a user's media streaming account and will provide personalized media content upon first use.

In either embodiment, the media delivery system 112 utilizes a user taste profile 242 from the user account to assign contexts to each of a plurality of settings on the PMSA 110. The user's taste profile 242 could change between the time that the PMSA 110 is ordered and when the PMSA 110 is delivered. As a result, the assigned contexts will be updated so that the PMSA 110 will have the most up to date personalization settings upon first use.

In some embodiments, the appliance provides a simplified user interface so that a user can easily control playback of media content in a vehicle while maintaining his or her focus on other tasks such as driving or navigating. For example, the appliance has a limited set of physical control elements that are intuitively controllable for playback of media content with little (often only one) input. Examples of such physical control elements include a rotatable knob and one or more physically-depressible buttons.

In some embodiments, the appliance also provides an output interface that can be easily connected to a vehicle audio system. Such output interfaces can include an auxiliary input port or Bluetooth. Output interfaces transmit media content from the appliance to the vehicle audio system for playback in the vehicle.

FIG. 1 illustrates an example system 100 for provisioning a personal media streaming appliance (PMSA). The system 100 includes at least a media delivery system 112, a network 116, an appliance identifying computing device 102, 108A, 108B and a personal media streaming appliance (PMSA) 110. The media delivery system 112 operates to provide media content through one or more media playback devices. Media playback devices are configured to play media content and can include the personal media streaming appliance (PMSA) system 110, a vehicle media playback system 114, and the user computing device 102.

The media delivery system 112 includes at least an appliance provisioning engine 126. The appliance provisioning engine 126 is further described in FIG. 3. In some embodiments, the appliance provisioning engine 126 is part of a system independent of the media delivery system 112. The media delivery system 112 communicates with multiple servers, computing devices, and other network enabled devices.

The appliance distributor server 106 receives communications from the media delivery system 112 through the network 116. The appliance distributor server 106 also communicates with a vendor computing device 108. In some embodiments, the appliance distributor server 106 operates within a warehouse W.

In some embodiments, the vendor computing device 108A, 108B operates as an appliance identification device by using an appliance input device 122. The appliance input device 122 can be, for example, a barcode scanner. The appliance input device 122 is used to input an appliance identifier 128. An example of an appliance identifier 128 is a barcode, which is, for example, placed either directly on a PMSA 110 or its packaging P.

In some embodiments, an order is received by a user computing device 102 such as a laptop computer or a mobile device. The order data is associated with a user account for playing media content. In an example embodiment, input is provided to the user computing device 102 to order a PMSA 110, for example through a user interface of the user computing device 102. The order is, in turn, communicated to a media delivery system 112 via the network 116.

This order is received through the network 116 by the media delivery system 112. The media delivery system 112 then forwards the order to the appliance distributor server 106 for fulfillment at the warehouse W.

After the order is fulfilled in the warehouse, a confirmation message is received at the media delivery system 112. The confirmation message can be received from the appliance distributor server 106, the vendor computing device 108A, or any source having information regarding the status of the appliance order.

The packaged PMSA 110 is transported via a carrier directly to the user's address. For example, the PMSA 110 is transported on a truck T to an address specified in the order. In the example of FIG. 1, the address may be for the user U's home. It should be understood that other transportation vehicles may be used in connection with the logistics of delivering the PMSA 110. For example, a plane, train, or other automobile, can be used instead of truck T and still be within the scope of the invention.

In some embodiments, a confirmation message is received at the media delivery system 112 indicating that the PMSA 110 has been delivered at the address specified in the order. The confirmation message can be received from a user computing device 102, the appliance distributor server 106, a carrier computing device, or any other source having information regarding the status of the appliance delivery.

In other examples, one or more units of PMSA 110 may be transported to a retailer R for distribution to customers. In such examples, the PMSA 110 may be identified using an appliance ID input device 122 associated with a vendor computing device 108B at the retailer R. The vendor computing device 108B operates as an appliance identification device and communicates through the network 116 with the media delivery system 112 to identify a PMSA 110 via an appliance identifier 128. As will be described below, in some embodiments, this identification process can be used to link the PMSA 110 with a user account.

Once the PMSA 110 arrives at its destination address, it is ready to be installed in a vehicle V. At this stage, the PMSA 110 is powered on. Media content 124 associated with the user account is communicated to the PMSA 110 and can be played over a vehicle media playback system 114. In some embodiments, the media content 124 is presented in the form of a playlist that includes information sufficient to cause a media delivery system 112 to deliver media content 124 (e.g., by downloading it or streaming).

The system 100 detects that a PMSA 110 has been purchased and associates the PMSA 110 with a media playback account that is associated with the purchase. In turn, the system 100 links the media playback account to the PMSA 110 so that upon the first use of the PMSA 110, personalized media content is available for playback. In some embodiments, the personalized media content is available for playback in a vehicle V without any additional set-up steps.

The PMSA system 110 operates to receive media content that is provided (e.g., streamed, transmitted, etc.) by a system external to the PMSA system 110, such as the media delivery system 112. The PMSA 110 can then transmit the media content to the vehicle media playback system 114 for playback. In some embodiments, the PMSA system 110 is a portable device which can be carried into and used in the vehicle V. The PMSA system 110 can be mounted to a structure of the vehicle V, such as the dashboard. In other embodiments, the PMSA system 110 can be configured to be built in a structure of the vehicle V. An example of the PMSA system 110 is illustrated and described in more detail with reference to FIGS. 2 and 6.

The vehicle media playback system 114 operates to receive media content from the PMSA system 110. The vehicle media playback system 114 generates a media output 124 to play the media content in the vehicle V. An example of the vehicle media playback system 114 is illustrated and described in further detail herein, such as with reference to FIG. 13.

The network 116 is a data communication network through which the PMSA system 110 and the media delivery system 112 can communicate. In some embodiments, the user computing device 102 can also communicate with the media delivery system 112 across the network 116. The network 116 typically includes a set of computing devices and communication links between the computing devices. The computing devices in the network 116 use the links to enable communication among the computing devices in the network. The network 116 can include one or more routers, switches, mobile access points, bridges, hubs, intrusion detection devices, storage devices, standalone server devices, blade server devices, sensors, desktop computers, firewall devices, laptop computers, handheld computers, mobile telephones, vehicular computing devices, and other types of computing devices.

In various embodiments, the network 116 includes various types of communication links. For example, the network 116 can include wired and/or wireless links, including cellular, Bluetooth, ultra-wideband (UWB), 802.11, ZigBee, and other types of wireless links. Furthermore, in various embodiments, the network is implemented at various scales. For example, the network 116 can be implemented as one or more vehicle area networks, local area networks (LANs), metropolitan area networks, subnets, wide area networks (WAN) (such as the Internet), or can be implemented at another scale. Further, in some embodiments, the network 116 includes multiple networks, which may be of the same type or of multiple different types.

In some embodiments, the network 116 can also be used for data communication between other media playback devices and the media delivery system 112. Because the network 116 is configured primarily for data communication between computing devices in the vehicle V and computing devices outside the vehicle V, the network 116 is also referred to herein as an out-of-vehicle network for out-of-vehicle data communication.

Figure 2:
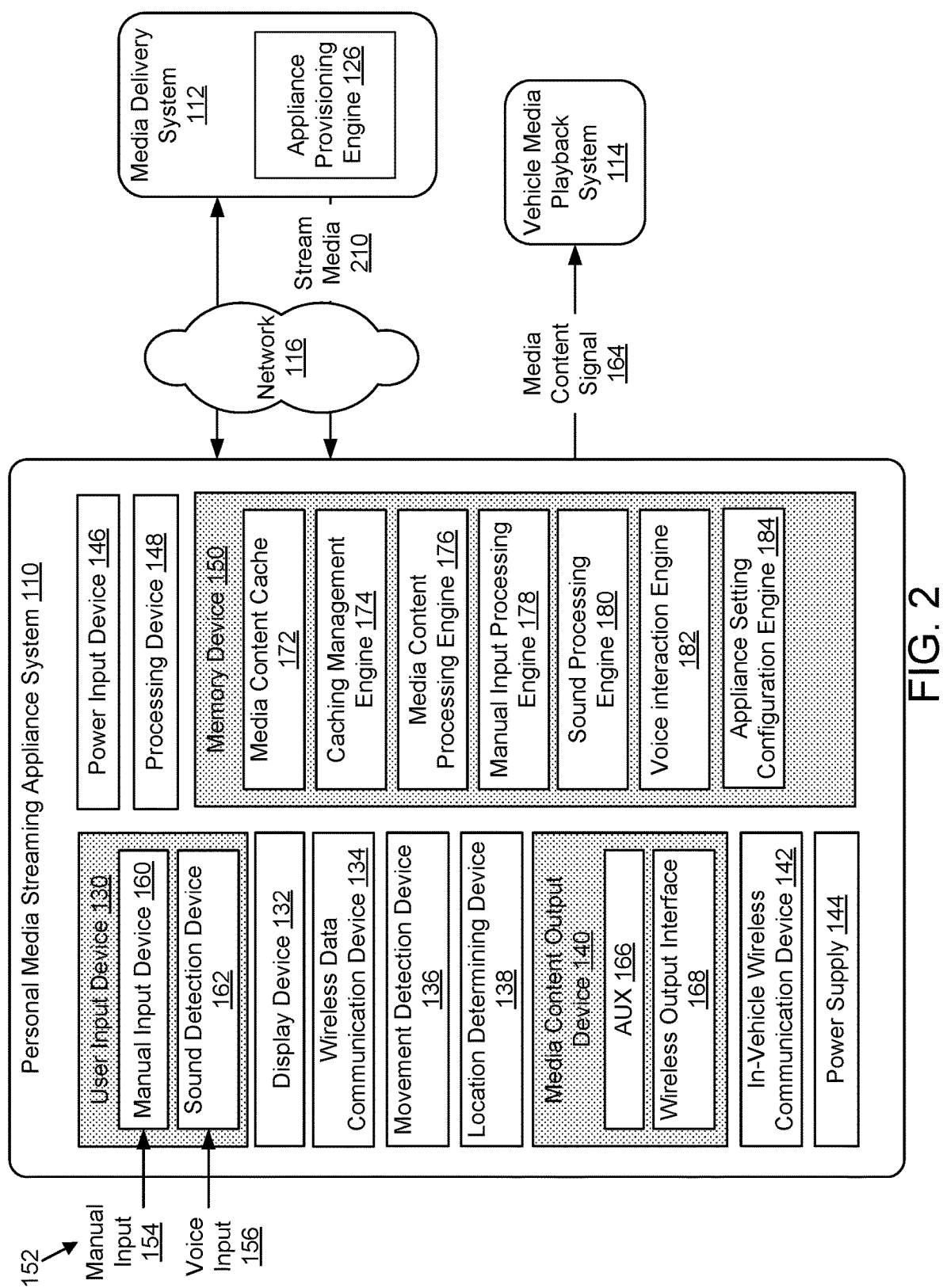
FIG. 2 is a block diagram of an example embodiment of the personal media streaming appliance (PMSA) system of FIG. 1.

FIG. 2 is a block diagram of an example embodiment of the PMSA system 110 of the media streaming system 100 shown in FIG. 1. In this example, the PMSA system 110 includes a user input device 130, a display device 132, a wireless data communication device 134, a movement detection device 136, a location determining device 138, a media content output device 140, an in-vehicle wireless communication device 142, a power supply 144, a power input device 146, a processing device 148, and a memory device 150.

In some embodiments, the PMSA system 110 is a system dedicated for streaming personalized media content in a vehicle environment. At least some embodiments of the PMSA system 110 have limited functionalities specifically selected for streaming media content from the media delivery system 112 at least via the network 116 and/or for providing other services associated with the media content streaming service. The PMSA system 110 may have no other general use such as found in other computing devices, such as smartphones, tablets, and other smart devices.

For example, in some embodiments, when the PMSA system 110 is powered up, the PMSA system 110 is configured to automatically activate a software application. The software application is configured to perform the media content streaming and media playback operations of the PMSA system 110 using at least one of the components, devices, and elements of the PMSA system 110. In some embodiments, the software application of the PMSA system 110 is configured to continue running until the PMSA system 110 is powered off or powered down to a predetermined level.

The user input device 130 operates to receive a user input 152 for controlling the PMSA system 110. As illustrated, the user input 152 can include a manual input 154 and a voice input 156. In some embodiments, the user input device 130 includes a manual input device 160 and a sound detection device 162.

The manual input device 160 operates to receive the manual input 154 for controlling playback of media content via the PMSA system 110. In addition, in some embodiments, the manual input 154 is received for managing various pieces of information transmitted via the PMSA system 110 and/or controlling other functions or aspects associated with the PMSA system 110.

In some embodiments, the manual input device 160 includes one or more manual control elements configured to receive various manual control actions, such as pressing actions and rotational actions. As described herein, the physical input device 160 includes a manual control knob 410 and one or more physical buttons 412, which is further illustrated and described with reference to FIG. 6.

The sound detection device 162 operates to detect and record sounds from proximate to the PMSA system 110. For example, the sound detection device 162 can detect sounds including the voice input 156. In some embodiments, the sound detection device 162 includes one or more acoustic sensors configured to detect sounds proximate to the PMSA system 110. For example, acoustic sensors of the sound detection device 162 includes one or more microphones. Various types of microphones can be used for the sound detection device 162 of the PMSA system 110.

In some embodiments, the voice input 156 is a user's voice for controlling playback of media content via the PMSA system 110. In addition, the voice input 156 manages various data transmitted via the PMSA system 110 and/or controlling other functions or aspects associated with the PMSA system 110.

In some embodiments, the sound detection device 162 is configured to cancel noises from the received sounds so that a desired sound (e.g., the voice input 156) is clearly identified. For example, the sound detection device 162 can include one or more noise-canceling microphones which are configured to filter ambient noise from the voice input 156. In addition or alternatively, a plurality of microphones of the sound detection device 162 are arranged at different locations in a body of the PMSA system 110 and/or oriented in different directions with respect to the body of the PMSA system 110, so that ambient noise is effectively canceled from the voice input 156 or other desired sounds being identified.

In some embodiments, the sounds detected by the sound detection device 162 can be processed by the sound processing engine 180 of the PMSA system 110 as described below.

Referring still to FIG. 2, the display device 132 operates to display information to the user U. Examples of such information include media content playback information, notifications, and other information.

In some embodiments, the display device 132 operates as a display screen only and is not capable of receiving a user input. By receiving the manual input 154 only via the manual input device 160 and disabling receipt of manual input via the display device 132, the user interface of the PMSA system 110 is simplified so that the user U can control the PMSA system 110 while maintaining focus on other activities in the vehicle V. It is understood however that, in other embodiments, the display device 132 is configured as a touch-sensitive display screen that operates as both a display screen and a user input device. In yet other embodiments, the PMSA system 110 does not include a display device.

As described herein, in some embodiments, the display device 132 is arranged at the manual input device 160. In other embodiments, the display device 132 is arranged separate from the manual input device 160.

The wireless data communication device 134 operates to enable the PMSA system 110 to communicate with one or more computing devices at a remote location that is outside the vehicle V. In the illustrated example, the wireless data communication device 134 operates to connect the PMSA system 110 to one or more networks outside the vehicle V, such as the network 116. For example, the wireless data communication device 134 is configured to communicate with the media delivery system 112 and receive media content from the media delivery system 112 at least partially via the network 116. The wireless data communication device 134 can be a wireless network interface of various types which connects the PMSA system 110 to the network 116. Examples of the wireless data communication device 134 include wireless wide area network (WWAN) interfaces, which use mobile telecommunication cellular network technologies. Examples of cellular network technologies include LTE, WiMAX, UMTS, CDMA2000, GSM, cellular digital packet data (CDPD), and Mobitex. In some embodiments, the wireless data communication device 134 is configured as a cellular network interface to facilitate data communication between the PMSA system 110 and the media delivery system 112 over cellular network.

The movement detection device 136 can be used to detect movement of the PMSA system 110 and the vehicle V. In some embodiments, the movement detection device 136 is configured to monitor one or more factors that are used to determine movement of the vehicle V. The movement detection device 136 can include one or more sensors that are configured to detect movement, position, and/or orientation of the PMSA system 110. As an example, the movement detection device 136 is operable to determine an orientation of the PMSA system 110. The movement detection device 136 can detect changes in the determined orientation and interpret those changes as indicating movement of the PMSA system 110.

In some embodiments, the movement detection device 136 includes an accelerometer. In other embodiments, the movement detection device 136 includes a gyroscope. Other sensors can also be used for the movement detection device 136, such as a magnetometer, a GPS receiver, an altimeter, an odometer, a speedometer, a shock detector, a vibration sensor, a proximity sensor, and an optical sensor (e.g., a light sensor, a camera, and an infrared sensor).

The location determining device 138 is a device that determines the location of the PMSA system 110. In some embodiments, the location determining device 138 uses one or more of Global Positioning System (GPS) technology (which may receive GPS signals), Global Navigation Satellite System (GLONASS) technology, cellular triangulation technology, network-based location identification technology, Wi-Fi positioning systems technology, and combinations thereof.

The media content output device 140 is an interface that enables the PMSA system 110 to transmit media content to the vehicle media playback system 114. Some embodiments of the PMSA system 110 do not have a speaker and thus cannot play media content independently. In these embodiments, the PMSA system 110 is not regarded as a standalone device for playing media content. Instead, the PMSA system 110 transmits media content to another media playback device, such as the vehicle media playback system 114 to enable the other media playback device to play the media content, such as through the vehicle stereo system.

As illustrated, the PMSA system 110 (e.g., a media content processing engine 176 thereof in FIG. 2) can convert media content to a media content signal 164, the media content output device 140 transmits the media content signal 164 to the vehicle media playback system 114. The vehicle media playback system 114 can play the media content based on the media content signal 164. For example, the vehicle media playback system 114 operates to convert the media content signal 164 into a format that is readable by the vehicle media playback system 114 for playback.

In some embodiments, the media content output device 140 includes an auxiliary (AUX) output interface 166 and a wireless output interface 168.

The AUX output interface 166 is configured to connect the PMSA system 110 to the vehicle media playback system 114 via a cable (e.g., a media content output line 450 in FIG. 6) of the PMSA system 110. In some embodiments, as illustrated in FIG. 6, the media content output line 450 extending from the PMSA system 110 is connected to an input connector 456 (e.g., an auxiliary input jack or port) of the vehicle media playback system 114. As illustrated herein, the media content output line 450 can be of various types, such as an analog audio cable or a USB cable.

The wireless output interface 168 is configured to connect the PMSA system 110 to the vehicle media playback system 114 via a wireless communication protocol. In some embodiments, the wireless output interface 168 is configured for Bluetooth connection. In other embodiments, the wireless output interface 168 is configured for other types of wireless connection. In some embodiments, the wireless output interface 168 is incorporated into, or implemented with, the in-vehicle wireless communication device 142. For example, when the media content output device 140 wirelessly transmits media content to the vehicle media playback system 114, the in-vehicle wireless communication device 142 can be used to implement the wireless output interface 168 of the media content output device 140.

Referring still to FIG. 2, the in-vehicle wireless communication device 142 operates to establish a wireless data communication between computing devices in a vehicle V.

The power supply 144 is included in the example PMSA system 110 and is configured to supply electric power to the PMSA system 110. In some embodiments, the power supply 144 includes at least one battery. The power supply 144 can be rechargeable. For example, the power supply 144 can be recharged using the power input device 146 that is connected to an external power supply. In some embodiments, the power supply 144 is included inside the PMSA system 110 and is not removable from the PMSA system 110. In other embodiments, the power supply 144 is removable from the PMSA system 110.

The power input device 146 is configured to receive electric power to maintain activation of components of the PMSA system 110. As described herein, the power input device 146 is connected to a power source of the vehicle V (e.g., a vehicle power supply 440 in FIG. 6) and use the electric power from the vehicle V as a primary power source to maintain activation of the PMSA system 110 over an extended period of time, such as longer than several minutes.

The processing device 148, in some embodiments, comprises one or more central processing units (CPU). In other embodiments, the processing device 148 additionally or alternatively includes one or more digital signal processors, field-programmable gate arrays, or other electronic circuits.

The memory device 150 typically includes at least some form of computer-readable media. Computer readable media includes any available media that can be accessed by the PMSA system 110. By way of example, computer-readable media include computer readable storage media and computer readable communication media.

Computer readable storage media includes volatile and nonvolatile, removable and non-removable media implemented in any device configured to store information such as computer readable instructions, data structures, program modules, or other data. Computer readable storage media includes, but is not limited to, random access memory, read only memory, electrically erasable programmable read only memory, flash memory and other memory technology, compact disc read only memory, blue ray discs, digital versatile discs or other optical storage, magnetic storage devices, or any other medium that can be used to store the desired information and that can be accessed by the PMSA system 110. In some embodiments, computer readable storage media is non-transitory computer readable storage media.

Computer readable communication media typically embodies computer readable instructions, data structures, program modules or other data in a modulated data signal such as a carrier wave or other transport mechanism and includes any information delivery media. The term "modulated data signal" refers to a signal that has one or more of its characteristics set or changed in such a manner as to encode information in the signal. By way of example, computer readable communication media includes wired media such as a wired network or direct-wired connection, and wireless media such as acoustic, radio frequency, infrared, and other wireless media. Combinations of any of the above are also included within the scope of computer readable media.

The memory device 150 operates to store data and instructions. In some embodiments, the memory device 150 stores instructions for a media content cache 172, a caching management engine 174, a media content processing engine 176, a manual input processing engine 178, a sound processing engine 180, a voice interaction engine 182, and an appliance setting configuration engine 184.

Some embodiments of the memory device 150 include the media content cache 172. The media content cache 172 stores media content items, such as media content items that have been received from the media delivery system 112. The media content items stored in the media content cache 172 may be stored in an encrypted or unencrypted format. In some embodiments, the media content cache 172 also stores metadata about media content items such as title, artist name, album name, length, genre, mood, era, etc. The media content cache 172 can further store playback information about the media content items and/or other information associated with the media content items.

The caching management engine 174 is configured to receive and cache media content in the media content cache 172 and manage the media content stored in the media content cache 172. In some embodiments, when media content is streamed from the media delivery system 112, the caching management engine 174 operates to cache at least a portion of the media content into the media content cache 172 so that at least a portion of the cached media content can be transmitted to the vehicle media playback system 114 for playback. In other embodiments, the caching management engine 174 operates to cache at least a portion of media content into the media content cache 172 while online so that the cached media content is retrieved for playback while the PMSA system 110 is offline.

The media content processing engine 176 is configured to process the media content that is received from the media delivery system 112, and generate the media content signal 164 usable for the vehicle media playback system 114 to play the media content. The media content signal 164 is transmitted to the vehicle media playback system 114 using the media content output device 140, and then decoded so that the vehicle media playback system 114 plays the media content in the vehicle V.

The manual input processing engine 178 operates to receive the manual input 154 via the manual input device 160. In some embodiments, when the manual input device 160 is actuated (e.g., pressed or rotated) upon receiving the manual input 154, the manual input device 160 generates an electric signal representative of the manual input 154. The manual input processing engine 178 can process the electric signal and determine the input (e.g., command or instruction) corresponding to the manual input 154 to the PMSA system 110. In some embodiments, the manual input processing engine 178 can perform a function requested by the manual input 154, such as controlling playback of media content. The manual input processing engine 178 can cause one or more other engines to perform the function associated with the manual input 154.

The sound processing engine 180 is configured to receive sound signals obtained from the sound detection device 162 and process the sound signals to identify different sources of the sounds received via the sound detection device 162. In some embodiments, the sound processing engine 180 operates to filter voice input 156 from noises included in the detected sounds. Various noise cancellation technologies, such as active noise control or cancelling technologies or passive noise control or cancelling technologies, can be used for filter the voice input from ambient noise. By using one or more of these techniques, the sound processing engine 180 provides sound processing customized for use in a vehicle environment.

In some embodiments, a recording of sounds captured using the sound detection device 162 can be analyzed using speech recognition technology to identify words spoken. The words may be recognized as commands that alter the playback of media content and/or other functions or aspect of the PMSA system 110. In some embodiments, the words and/or the recordings may also be analyzed using natural language processing and/or intent recognition technology to determine appropriate actions to take based on the spoken words. Additionally or alternatively, the sound processing engine 180 may determine various sound properties about the sounds proximate to the PMSA system 110 such as volume, dominant frequency or frequencies, etc. These sound properties may be used to make inferences about the environment proximate to the PMSA system 110.

Figure 3:
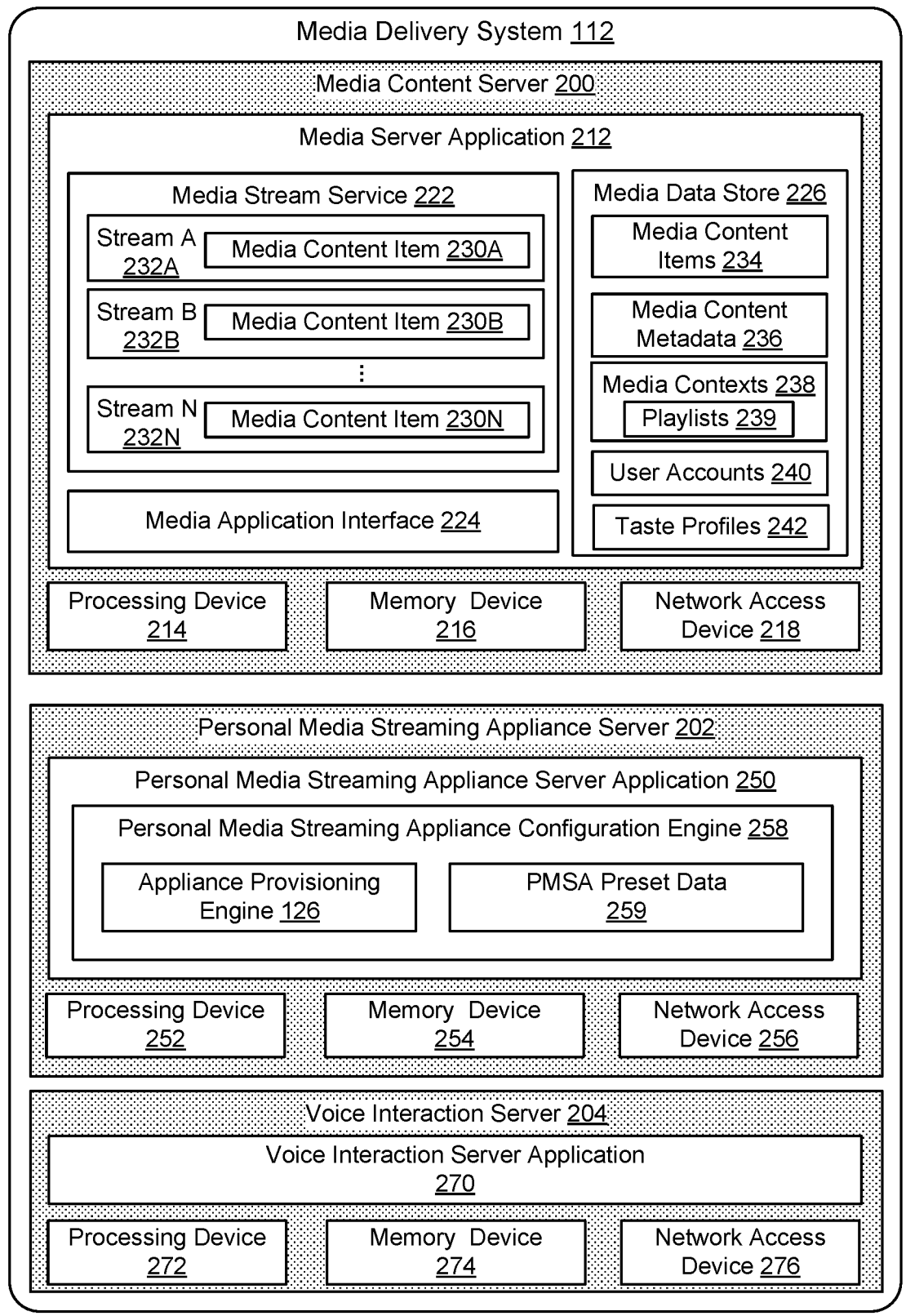
FIG. 3 is a block diagram of an example embodiment of the media delivery system of FIG. 1.

The voice interaction engine 182 operates to cooperate with the media delivery system 112 (e.g., a voice interaction server 204 thereof as illustrated in FIG. 3) to identify a command (e.g., a user intent) that is conveyed by the voice input 156. In some embodiments, the voice interaction engine 182 transmits the voice input 156 that is detected by the sound processing engine 180 to the media delivery system 112. The media delivery system 112 operates to determine a command intended by the voice input 156. In other embodiments, at least some of the determination process of the command can be performed locally by the voice interaction engine 182.

In addition, some embodiments of the voice interaction engine 182 can operate to cooperate with the media delivery system 112 (e.g., the voice interaction server 204 thereof) to provide a voice assistant that performs various voice-based interactions with the user. Voice-based interactions include voice feedbacks, voice notifications, voice recommendations, and other voice-related interactions and services.

The appliance setting configuration engine 184 operates to send and receive signals from the media delivery system 112 to modify preset settings at the PMSA system 110. Customized settings for controls of the PMSA 110 such as preset buttons 412 can be personalized by inputs received at the PMSA 110 or by modifying personalization settings through the media delivery system 112.

FIG. 3 is a block diagram of an example embodiment of the media delivery system 112 of FIG. 1. The media delivery system 112 includes a media content server 200, a personal media streaming appliance (PMSA) server 202, and a voice interaction server 204.

The media delivery system 112 comprises one or more computing devices and provides media content to the PMSA system 110 and, in some embodiments, other media playback devices, as well. In addition, the media delivery system 112 interacts with the PMSA system 110 to provide the PMSA system 110 with various functionalities.

In at least some embodiments, the media content server 200, the PMSA server 202, and the voice interaction server 204 are provided by separate computing devices. In other embodiments, the media content server 200, the PMSA server 202, and the voice interaction server 204 are provided by the same computing device(s). Further, in some embodiments, at least one of the media content server 200, the PMSA server 202, and the voice interaction server 204 is provided by multiple computing devices. For example, the media content server 200, the PMSA server 202, and the voice interaction server 204 may be provided by multiple redundant servers located in multiple geographic locations.

Although FIG. 3 shows a single media content server 200, a single PMSA server 202, and a single voice interaction server 204, some embodiments include multiple media servers, multiple PMSA servers, and/or multiple voice interaction servers. In these embodiments, each of the multiple media servers, multiple PMSA servers, and multiple voice interaction servers may be identical or similar to the media content server 200, the PMSA server 202, and the voice interaction server, respectively, as described herein, and may provide similar functionality with, for example, greater capacity and redundancy and/or services from multiple geographic locations. Alternatively, in these embodiments, some of the multiple media servers, the multiple PMSA servers, and/or the multiple voice interaction servers may perform specialized functions to provide specialized services. Various combinations thereof are possible as well.

The media content server 200 transmits stream media 210 (FIG. 2) to media playback devices such as the PMSA system 110. In some embodiments, the media content server 200 includes a media server application 212, a processing device 214, a memory device 216, and a network access device 218. The processing device 214 and the memory device 216 may be similar to the processing device 148 and the memory device 150, respectively, which have each been previously described. Therefore, the description of the processing device 214 and the memory device 216 are omitted for brevity purposes.

The network access device 218 operates to communicate with other computing devices over one or more networks, such as the network 116. Examples of the network access device include one or more wired network interfaces and wireless network interfaces. Examples of such wireless network interfaces of the network access device 218 include wireless wide area network (WWAN) interfaces (including cellular networks) and wireless local area network (WLANs) interfaces. In other examples, other types of wireless interfaces can be used for the network access device 218.

In some embodiments, the media server application 212 is configured to stream media content, such as music or other audio, video, or other suitable forms of media content. The media server application 212 includes a media stream service 222, a media application interface 224, and a media data store 226. The media stream service 222 operates to buffer media content, such as media content items 230A, 230B, and 230N (collectively 230), for streaming to one or more streams 232A, 232B, and 232N (collectively 232).

The media application interface 224 can receive requests or other communication from media playback devices or other systems, such as the PMSA system 110, to retrieve media content items from the media content server 200. For example, in FIG. 2, the media application interface 224 receives communication from the PMSA system 110, such as the caching management engine 174 thereof, to receive media content from the media content server 200.

In some embodiments, the media data store 226 stores media content items 234, media content metadata 236, media contexts 238, user accounts 240, and taste profiles 242. The media data store 226 may comprise one or more databases and file systems. Other embodiments are possible as well.

As discussed herein, the media content items 234 (including the media content items 230) may be audio, video, or any other type of media content, which may be stored in any format for storing media content.

The media content metadata 236 provides various information associated with the media content items 234. In some embodiments, the media content metadata 236 includes one or more of title, artist name, album name, length, genre, mood, era, etc.

The media content metadata 236 operates to provide various pieces of information associated with the media content items 234. In some embodiments, the media content metadata 236 includes one or more of title, artist name, album name, length, genre, mood, era, etc.

Explicit metadata refers to factual or explicit information relating to music. Explicit metadata may include album and song titles, artist and composer names, other credits, album cover art, publisher name and product number, and other information. Explicit metadata is generally not derived from the music itself or from the reactions or opinions of listeners.

At least some of the metadata 236, such as explicit metadata (names, credits, product numbers, etc.), for a large library of songs or tracks can be evaluated and provided by one or more third party service providers. Explicit metadata may include numerical, text, pictorial, and other information. Explicit metadata may also be stored in an XML or other file. All or portions of the metadata may be stored in separate files associated with specific tracks. All or portions of the metadata, such as acoustic fingerprints and/or description vectors, may be stored in a searchable data structure, such as a k-D tree or other database format.

Referring still to FIG. 3, each of the media contexts 238 is used to identify one or more media content items 234. In some embodiments, the media contexts 238 are configured to group one or more media content items 234 and provide a particular context to the group of media content items 234. Some examples of the media contexts 238 include albums, artists, playlists, and individual media content items. By way of example, where a media context 238 is an album, the media context 238 can represent that the media content items 234 identified by the media context 238 are associated with that album.

As described above, the media contexts 238 can include playlists 239. The playlists 238 are used to identify one or more of the media content items 234. In some embodiments, the playlists 238 identify a group of the media content items 234 in a particular order. In other embodiments, the playlists 238 merely identify a group of the media content items 234 without specifying a particular order. Some, but not necessarily all, of the media content items 234 included in a particular one of the playlists 238 are associated with a common characteristic such as a common genre, mood, or era.

In some embodiments, media content items in a playlist 238 can be played by selecting the playlist 238 via a media playback device, such as the PMSA system 110. The media playback device then operates to communicate with the media delivery system 112 so that the media delivery system 112 retrieves the media content items identified by the playlist 238 and transmits data for the media content items to the media playback device for playback.

In some embodiments, the playlist 238 includes a playlist title and a list of content media item identifications. The playlist title is a title of the playlist, which can be received through inputs on a user computing device 102. The list of content media item identifications includes one or more media content item identifications (IDs) that refer to respective media content items 234.

The user accounts 240 are used to identify users of a media streaming service provided by the media delivery system 112. In some embodiments, a user account 240 allows for authentication before providing access to the media delivery system 112. In some embodiments, input for login can be received at different devices (e.g., the PMSA system 110 and the user computing device 102) to access data associated with the user account in the media delivery system 112. User authentication information, such as a username, an email account information, a password, and other credentials, can be used to access a user media streaming account 240.

The user accounts 240 include data for devices associated with each user account. The user accounts 240 data store keeps track of the devices that can access the media content server 200 using a particular user account. In some embodiments, the user accounts 240 data store records order numbers for new devices that are ordered in order to associate the new devices with particular user accounts. Data stored in the user accounts 240 data store is further described with respect to FIG. 11.

The taste profiles 242 contain records indicating media content tastes of users. A taste profile 242 can be associated with a user account and used to maintain an in-depth understanding of the music activity and preferences associated with a user account. Libraries and wrappers can be accessed to create taste profiles from a media library of the user account, social website activity and other specialized databases to mine music preferences.

In some embodiments, each taste profile 242 is a representation of media consumption activities. The media consumption activities can include a wide range of information such as artist plays, song plays, skips, dates of listen, songs per day, playlists, play counts, start/stop/skip data for portions of a song or album, contents of collections, rankings, preferences, or other mentions received via a client device, or other media plays, such as websites visited, book titles, movies watched, playing activity during a movie or other presentations, ratings, or terms corresponding to the media, such as "comedy", "sexy", etc. In addition, the taste profiles 242 can include other information. For example, the taste profiles 242 can include libraries and/or playlists of media content items associated with the user account.

The taste profiles 242 can be used for a number of purposes. One use of taste profiles is for creating personalized playlists (e.g., personal playlisting). An API call associated with personal playlisting can be used to return a playlist customized to a particular user account. For example, the media content items listed in the created playlist are constrained to the media content items in a taste profile associated with the particular user account.

Yet another use case is for personalized recommendation, where the contents of a taste profile are used to represent an individual's taste. This API call uses a taste profile as a seed for obtaining recommendations or playlists of similar artists.

Yet another example use case for taste profiles is referred to as user-to-user recommendation. This API call is used to discover users with similar tastes by comparing the similarity of taste profile item(s) associated with users.

A taste profile 242 can represent a single user account or multiple users' accounts. Conversely, a single user account can have multiple taste profiles 242. For example, one taste profile can be generated in connection with media content play activity of a user account, whereas another separate taste profile can be generated for the same user account based on the selection of media content items and/or artists for a playlist.

Referring still to FIG. 3, the PMSA server 202 operates to provide various functionalities to the PMSA system 110. In some embodiments, the PMSA server 202 includes a personal media streaming appliance (PMSA) server application 250, a processing device 252, a memory device 254, and a network access device 256. The processing device 252, the memory device 254, and the network access device 256 may be similar to the processing device 214, the memory device 216, and the network access device 218, respectively, which have each been previously described. In some embodiments, the PMSA server 202 is independent of the media delivery system 112.

In some embodiments, the PMSA server application 250 operates to interact with the PMSA system 110 and enable the PMSA system 110 to perform various functions. Such functions can include receiving a manual input, displaying information, providing notifications, performing power management, providing location-based services, and authenticating logins for the PMSA system 110. The PMSA server application 250 can interact with other servers, such as the media content server 200 and the voice interaction server 204, to execute such functions.

The PMSA server application 250 includes a personal media streaming appliance configuration engine 258. The PMSA configuration engine 258 operates to configure settings for a PMSA that are personalized to a user's account. For example, the PMSA configuration engine 258 assigns media contexts to preset settings of the PMSA. Functionality of the PMSA configuration engine 258 is further described with respect to FIGS. 10 and 14.

The PMSA configuration engine 258 includes an appliance provisioning engine 126. The appliance provisioning engine 126 operates to set up the preset settings of a PMSA before its first operation. The appliance provisioning engine 126 links a PMSA with a particular user account so that preset settings are customized to an account of that user. The appliance provisioning engine 126 is further described with respect to FIG. 14. In some embodiments, the appliance provisioning engine 126 is independent of the PMSA server application 250.

Referring still to FIG. 3, the voice interaction server 204 operates to provide various voice-related functionalities to the PMSA system 110. In some embodiments, the voice interaction server 204 includes a voice interaction server application 270, a processing device 272, a memory device 274, and a network access device 276. The processing device 272, the memory device 274, and the network access device 276 may be similar to the processing device 214, the memory device 216, and the network access device 218, respectively, which have each been previously described.

In some embodiments, the voice interaction server application 270 operates to interact with the PMSA system 110 and enable the PMSA system 110 to perform various voice-related functions, such as voice feedback and voice notifications. In some embodiments, the voice interaction server application 270 is configured to receive data (e.g., speech-to-text (STT) data) representative of a voice input received via the PMSA system 110. The voice interaction server application 270 can process the data to interpret a command (e.g., a request or instruction). In some embodiments, at least one of the media content server 200, the PMSA server 202, and the voice interaction server 204 may be used to perform one or more functions corresponding to the command.

Figure 4:
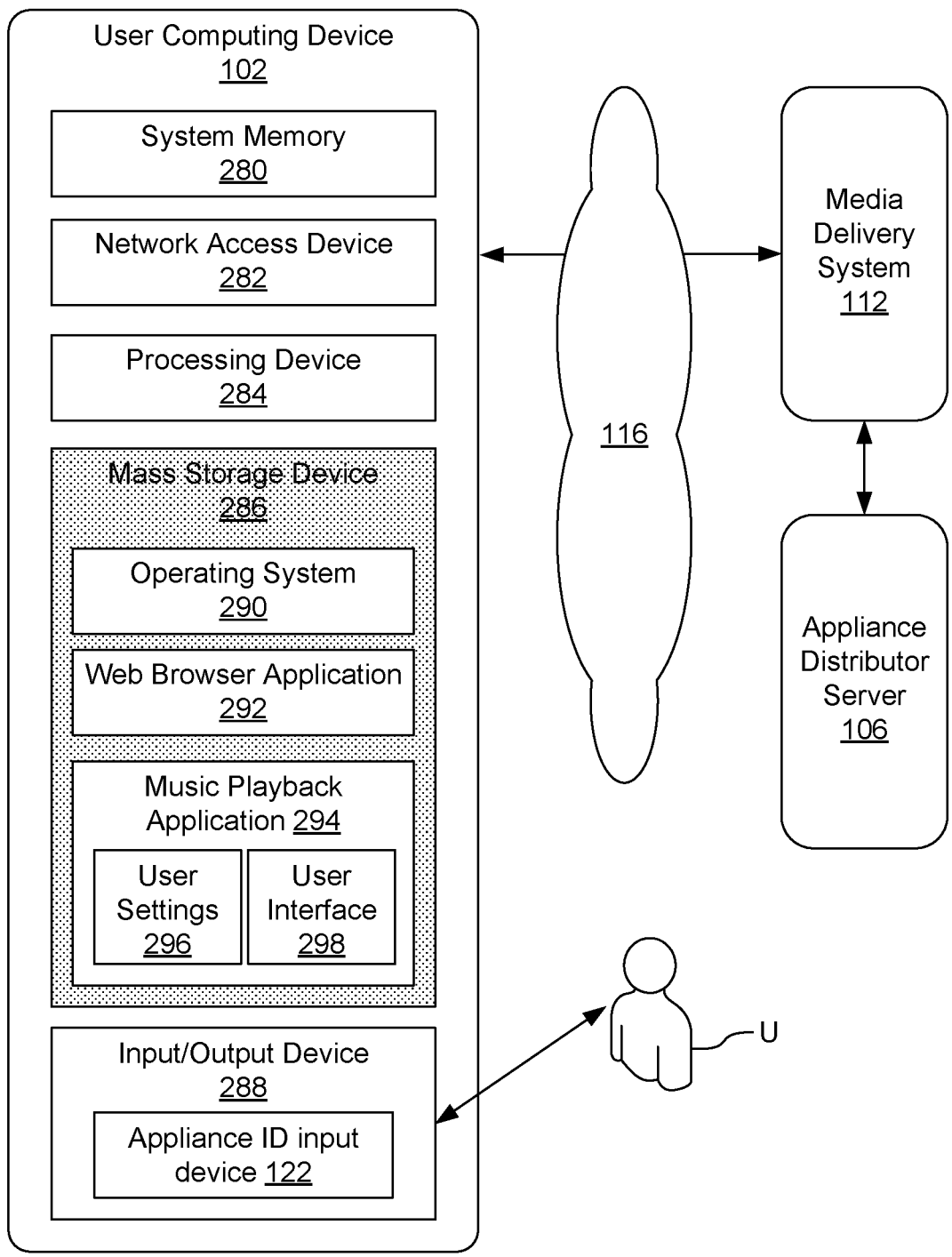
FIG. 4 is a block diagram of an example embodiment of the user computing device of FIG. 1.

FIG. 4 is a block diagram of an example embodiment of the user computing device 102. The user computing device 102 includes a system memory 280, a network access device 282, a processing device 284, a mass storage device 286, and an input/output device 288.

The network access device 282 operates to communicate with other computing devices over one or more networks, such as the network 116. Examples of the network access device 282 include wired network interfaces and wireless network interfaces. Wireless network interfaces include infrared, BLUETOOTH® wireless technology, 802.11a/b/g/n/ac, cellular or other radio frequency interfaces wireless wide area network (WWAN) interfaces (including cellular networks), and wireless local area network (WLANs) interfaces.

The processing device 284 in some embodiments comprises one or more central processing units (CPU). In other embodiments, the processing device 284 additionally or alternatively includes one or more digital signal processors, field-programmable gate arrays, or other electronic circuits.

The mass storage device 286 includes at least an operating system 290, a web browser application 292, and a music playback application 294.

The operating system 290 provides general functionality to the user computing device 102. This is software that allows for basic tasks for be performed such as scheduling tasks, executing applications, and controlling peripherals.

The web browser application 292 operates to present a user interface on the user computing device 102 for interacting with the internet. The web browser application 292 may be employed to order a PMSA 110.

The media playback application 294 receives inputs for commands to listen to media content, adjust settings for media content playback, and provide profile information for a user account. The media playback application 294 receives inputs from an input/output device 288 to select media content to play. The media playback application 294 can also record the media content that is consumed to send to the media delivery system 112 to build a taste profile 242 for the user account. The media playback application 294 includes user settings 296, which can be adjusted to reflect the preferences of a user associated with the user account. Inputs are received at an input/out device 288 that instruct the media playback application 294 to modify settings for media playback. Updated settings are stored in the user settings 296 database.

Examples of user settings 296 include assigning media contexts to each of a plurality of presets associated with physical controls on a PMSA. In some examples, a playlist, artist, album, genre, or radio station can be assigned to a particular preset button on the PMSA. Other settings can include having a preference for shuffling music tracks as they are played in the context.

The input/output device 288 includes an appliance ID input device 122. The appliance ID input device 122 can include a keyboard, a touch screen, a camera, a QR reader, or a barcode scanner. The appliance ID input device 122 is used to identify a PMSA 110 appliance identifier 128. In some embodiments, the user U sets up the PMSA 110 for use with his or her media streaming account. Input is received at a user computing device 102 to log into a user account. The appliance ID input device 122 allows for receipt of the appliance identifier 128 into the user computing device 102. The music playback application 294 then communicates the user account information and the appliance identifier 128 to the media delivery system 112.

Figure 5:
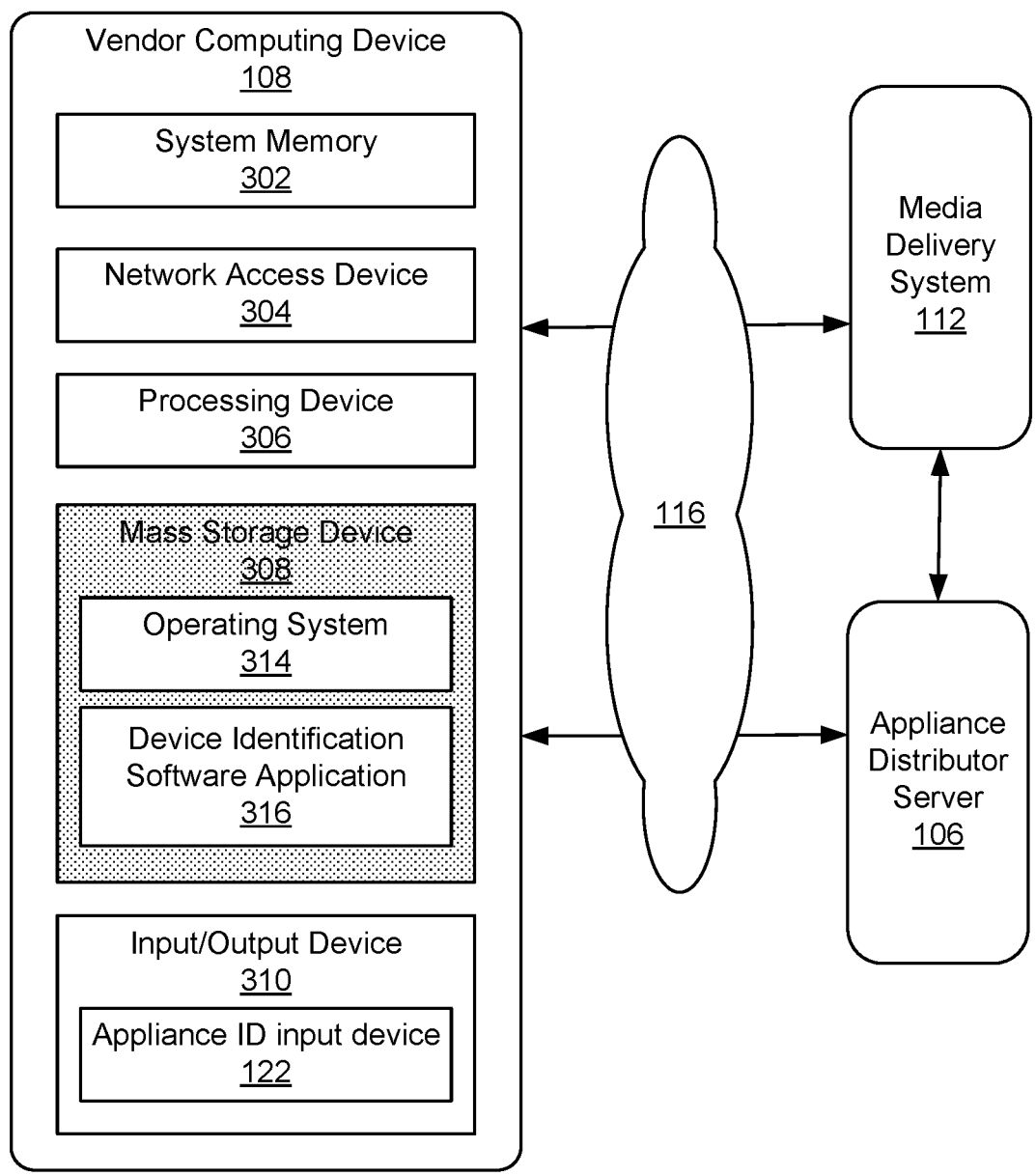
FIG. 5 is a block diagram of an example embodiment of the vendor computing device of FIG. 1.

FIG. 5 illustrates a schematic block diagram of a vendor computing device 108. The vendor computing device 108A of FIG. 1 was shown in a warehouse W while another vendor computing device 108B was shown in the context of a retailer R. The vendor computing device 108A in the warehouse W communicates with a media delivery system 112 and an appliance distributor server 106 via network 116. The vendor computing device 108B at the retailer R communicates with the media delivery system 112. The vendor computing device 108 includes a system memory 302, a network access device 304, a processing device 306, a mass storage device 308, and an input/out device 310.

The system memory 302, network access device 304, and processing device 306 are similar to the system memory 280, network access device 282, and processing device 284 described above in FIG. 4.

The mass storage device 308 includes an operating system 314 and device identification software application 316. The operating system 314 is similar to the operating system 290 of FIG. 4. The device identification software application 316 receives identifying information for a device or appliance from the appliance ID input device 122. The device identification software application operates to communicate the appliance ID along with an order identifier or account identifier to the media delivery system 112. The media delivery system 112 then pairs each appliance or device ID with a user's media streaming account.

Figure 7B:
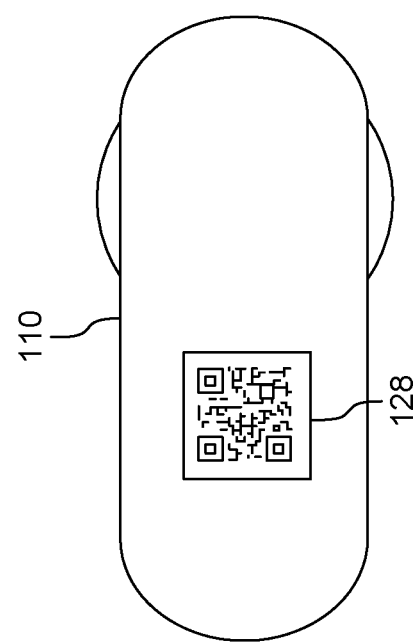
FIG. 7B illustrates a further example embodiment of the PMSA system including an appliance identification marker
Figure 7A:
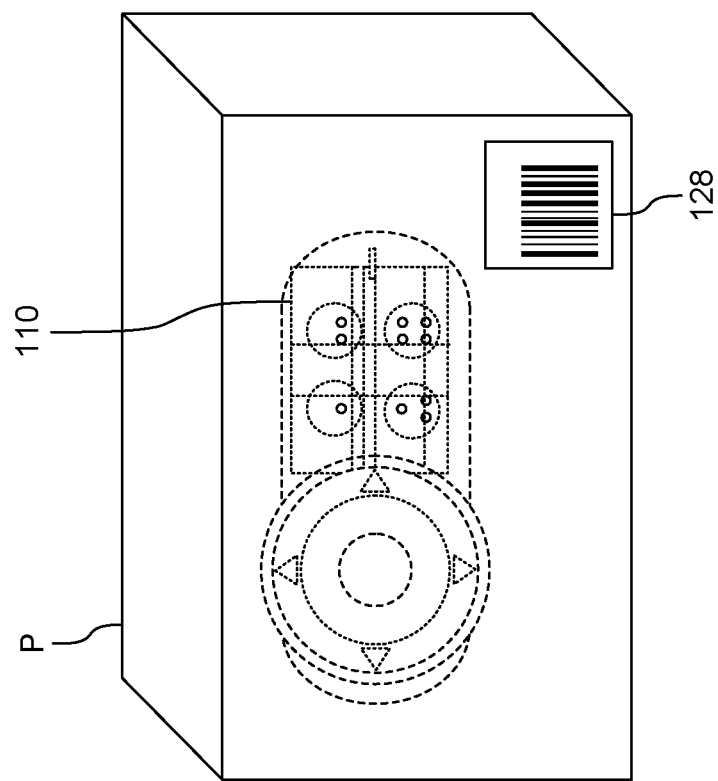
FIG. 7A illustrates an example embodiment of the PMSA system including an appliance identification marker.

The input/output device 310 includes an appliance ID input device 122. The appliance ID input device 122 is used to input an appliance identifier 128 to the vendor computing device 108. Examples of appliance identifiers 128 are shown in FIGS. 7A and 7B. Appliance identifiers 128 can include barcodes, QR codes, serial numbers, bokodes, and RFID tags. The appliance ID input device 122 is configured to scan, read, or receive other input of an appliance identifier 128. In some embodiments, the input/output device 310 includes more than one appliance ID input device 122.

In the context of a warehouse W, the vendor computing device 108A is used to receive an appliance identifier 128 associated with a PMSA 110 using the appliance ID input device 122. The appliance identifier 128 identifies the PMSA 110 and that information is communicated to the appliance distributor server 106. The appliance distributor server 106 then communicates that information to the media delivery system 112. The media delivery system 112 receives the appliance identifier 128 along with a confirmation that an order has been fulfilled. The appliance identifier 128 can be associated with a user account by the media delivery system 112.

In the context of a retailer R, a vendor computing device 108B is usable to receive an appliance identifier 128 for a PMSA 110 that is being sold in a retail store. The vendor computing device 108B receives the appliance identifier 128 through the appliance ID input device 122. An employee of the retailer R communicates with the user U to obtain their account information. Login information is received through inputs at the vendor computing device 108B such as a keyboard. The appliance identifier 128 information and the user's account information are both communicated through the network 116 to the media delivery system 112, where the device ID and user's account ID are associated and stored in the media delivery system 112 as described in further detail with respect to FIGS. 8 and 11.

FIG. 6 schematically illustrates an example embodiment of the PMSA system 110 of FIG. 1. In this example, the PMSA system 110 includes a personal media streaming appliance (PMSA) 400 and a docking device 402.

As described herein, the PMSA system 110 is sized to be relatively small so that the PMSA system 110 can be easily mounted to a structure (e.g., a dashboard or head unit) of the vehicle V. By way of example, the PMSA system 110 is configured to be smaller than a typical mobile computing device, such as a smartphone. Further, the PMSA 400 provides a simplified user interface for controlling playback of media content. For example, the PMSA 400 has a limited set of physical control elements, such as a single rotary knob and one or more physical buttons.

The PMSA 400 is configured to include at least some of the devices of the PMSA system 110 as illustrated with reference to FIG. 2. In some embodiments, the PMSA 400 includes all of the devices of the PMSA system 110 as illustrated in FIG. 2.

As illustrated also in FIG. 2, some embodiments of the PMSA 400 include the user input device 130 that includes the manual input device 160 and the sound detection device 162. Some embodiments of the manual input device 160 include a control knob 410 and one or more physical buttons 412.

In some embodiments, the control knob 410 is configured to be maneuverable in multiple ways. For example, the control knob 410 provides a plurality of regions on a knob face 414 that are independently depressible upon receiving a pressing action against the knob face 414. In the illustrated example, the control knob 410 has five regions 416 (e.g., up, down, left, right, and middle) that are separately depressible. At least some of the regions 416 are configured to receive inputs of different commands (e.g., requests or instructions).

In other embodiments, the control knob 410 is configured to be manipulated in different ways, such as tilting in multiple directions or sliding in multiple directions.

In addition, the control knob 410 is configured to be rotatable. For example, the control knob 410 can be rotated with respect to a body 420 of the PMSA 400. The control knob 410 can be rotatable in both directions 422 (e.g., clockwise and counterclockwise). In other embodiments, the control knob 410 is configured to rotate in only one direction.

The control knob 410 is used to receive inputs for controlling playback of media content. In addition or alternatively, the control knob 410 can be used to receive inputs for other purposes or functions.

The physical buttons 412 are configured to be depressed upon receiving a pressing action against the physical buttons 412. In the illustrated example, the PMSA 400 has four physical buttons 412A-412D. In some embodiments, each of the physical buttons 412 is configured to receive a single command. In other embodiments, at least one of the physical buttons 412 is configured to receive multiple commands.

In some embodiments, the physical buttons 412 are used as buttons that are preset to be associated with particular media content context, thereby facilitating playback of such media content. In these embodiments, the physical buttons 412 are also referred to as preset buttons 412.

In addition, the PMSA 400 also includes the display screen 132. In some embodiments, the display screen 132 is arranged at the knob face 414 of the control knob 410. As described herein, in some embodiments, the display screen 132 does not include a touch sensitive display screen, and is configured as a display device only. In other embodiments, however, the display screen 132 can be configured to be touch sensitive and receive an input through the display screen 132 as well.

Referring still to FIG. 6, the docking device 402 is configured to mount the PMSA 400 to a structure of the vehicle V. The docking device 402 is configured to removably mount the PMSA 400 thereto. The docking device 402 is further configured to attach to a structure of the vehicle V (FIG. 13) so that the PMSA 400 is positioned at the structure of the vehicle V.

In some embodiments, an interface between the PMSA 400 and the docking device 402 is configured to prevent the PMSA 400 from rotating relative to the docking device 402 when the control knob 410 is manipulated. For example, the docking device 402 has a portion (e.g., a front portion of the docking device 402) configured to interlock a corresponding portion of the PMSA 400 (e.g., a rear portion of the PMSA 400) when the PMSA 400 is mounted to the docking device 402 such that the portion of the docking device 402 and the corresponding portion of the PMSA 400 form the interface therebetween.

In addition or alternatively, the PMSA 400 and the docking device 402 include magnetic materials at the interface therebetween so that the PMSA 400 and the docking device 402 are magnetically coupled to each other.

In some embodiments, the docking device 402 includes one or more electrical contacts 430 that are electrically connected to corresponding electrical contacts (not shown in FIG. 6) of the PMSA 400 when the PMSA 400 is mounted to the docking device 402. Such electrical connection between the PMSA 400 and the docking device 402 is provided for various functions.

First, as described herein, the PMSA 400 does not include a battery sufficient for a prolonged use without an external power supply. In some embodiments, the PMSA 400 is primarily powered by a vehicle power supply 440. In some embodiments, the docking device 402 has a power receiving line 444 for connection to the vehicle power supply 440. For example, the power receiving line 444 extends from the docking device 402 and has a power connector 446 at a free end that is configured to mate with a vehicle power outlet 442 (e.g., a 12V auxiliary power outlet) of the vehicle power supply 440. As such, the docking device 402 receives electric power from the vehicle power supply 440 via the power receiving line 444, and the electrical connection between the PMSA 400 and the docking device 402 is configured to deliver electric power from the docking device 402 to the PMSA 400.

Second, as described herein, the PMSA 400 does not have a speaker and is designed to transmit media content signals to the vehicle media playback system 114 so that the media content is played through the vehicle media playback system 114. In some embodiments, the docking device 402 includes a media content output line 450 (also referred to herein as a media content output cable) (e.g., an auxiliary (AUX) output) configured to connect with the vehicle media playback input connector 456 (e.g., an auxiliary (AUX) port) of the vehicle media playback system 114. The docking device 402 is configured to receive media content signals from the PMSA 400 via the electrical connection between the PMSA 400 and the docking device 402, and transmit the signals to the vehicle media playback system 114 via the media content output line 450. In the illustrated embodiment, the power receiving line 444 and the media content output line 450 are combined to be a single line extending from the docking device 402 until the power connector 446, and the media content output line 450 further extends (or branches out) from the power connector 446 and terminates at a media output connector 452. The media output connector 452 is configured to connect to the vehicle media playback input connector 456 of the vehicle media playback system 114. In other embodiments, the media content output line 450 and the power receiving line 444 extend separately from the docking device 402.

In other embodiments, one or more of the power receiving line 444 and the media content output line 450 are directly connected to, and extend from, the PMSA 400 so that electric power is directly supplied to the PMSA 400 without the docking device 402 involved, and that the media content is directly transmitted to the vehicle media playback system 114 without passing through the docking device 402.

Third, the electrical connection between the PMSA 400 and the docking device 402 can be used to detect connection between the PMSA 400 and the docking device 402.

The PMSA system 110 can be provided to a user U in at least three different ways. In the first method, input is received at a user computing device 102 such as a laptop or a mobile device to log into a user media streaming account 240. Input is received at the user computing device 102 to place an order for a PMSA system 110 through the media streaming account. The order is then linked to the user's account at the time of ordering. The appliance 110 is shipped directly from the manufacturer or distributor to an address provided with the order. During the shipping process, the appliance is paired to the user account. The PMSA 110 is programmed to receive instructions from the media delivery system 112 immediately upon powering on. The PMSA 110 can immediately play personalized media content upon receiving input at a physical control such as the physical buttons 412.

In another method, the PMSA system 110 is shipped to a retailer, such as the retailer R of FIG. 1. The retailer R offers the PMSA system 110 for sale to customers that may or may not already have a media streaming account. At the retailer, an employee assists with setting up the PMSA 110 for use with a media streaming account.

For new users, the employee assists by providing inputs to a vendor computing device 108B to set up a new account. Commands are received at the vendor computing device 108B and communicated to the media delivery system 112 to link the account with the PMSA 110. In such instances, the PMSA will automatically update with settings that are configured to play popular music or otherwise provide media content to be available for playback upon first use of the PMSA 110.

For existing users of a media streaming account, the past media consumption activity associated with the media streaming account is evaluated and used. Media contexts are selected at the media delivery system 112 that will be associated with the physical controls of the PMSA 110 so that upon first use of the device, the PMSA 110 will play media content selected specifically for the user account.

In yet another method, the PMSA system 110 is either shipped to the user U or the user U purchases the PMSA system 110 at a retailer. However, the user's media streaming account is not linked to the PMSA in advance. In such instances, input is received at a user computing device 102 to log into the user's media streaming account. Input is received at the user computing device 102 identifying the PMSA 110. For example, an input of a QR code can be received. The media delivery system 112 receives the appliance identifying information and associates the PMSA 110 with the user account. Then, immediately after the PMSA 110 is powered on, media content selected for the media streaming account is received from the media delivery system 112 and played on the PMSA 110.

Regardless of the method by which the user U receives the PMSA system 110, the PMSA will be provided with an appliance identifier 128 of some sort. The appliance identifier 128 could be placed on packaging of the PMSA 110 or be directly placed on the appliance itself.

FIGS. 7A & FIG. 7B show two examples of placement of the appliance identifier 128. In the example of FIG. 7A, the appliance identifier 128 is a barcode placed on the outside of a packaging P which encloses the personal media streaming appliance PMSA 110. The appliance identifier barcode 128 can be scanned by an employee of a warehouse. The warehouse vendor computing device 108B submits an appliance ID to the media delivery system 112 where the device ID is paired with an account ID. This can be performed using a computing device such as the vendor computing device 108 of FIG. 1.

In other examples, a retailer R may scan the appliance identifier 128 at the time of a purchase. The retailer R obtains user account information, scans the appliance identifier 128 with the appliance ID input device 122 and submits both the user account number and appliance ID number through the network 116 to the media delivery system 112 where it is recorded. In yet another embodiment, a user may set-up the PMSA 110 for use with their media streaming account themselves. The user computing device 102 receives the appliance identifier 128 through a camera or input on a keyboard.

FIG. 7B shows an embodiment in which the appliance identifier 128 is placed directly on the PMSA 110. In this example, the appliance identifier 128 is a QR code affixed to a back surface of the PMSA 110. The appliance identifier 128 can be captured by a computing device in a warehouse, at a retailer, or with a user computing device 102 as described above for FIG. 7A.

Figure 8:
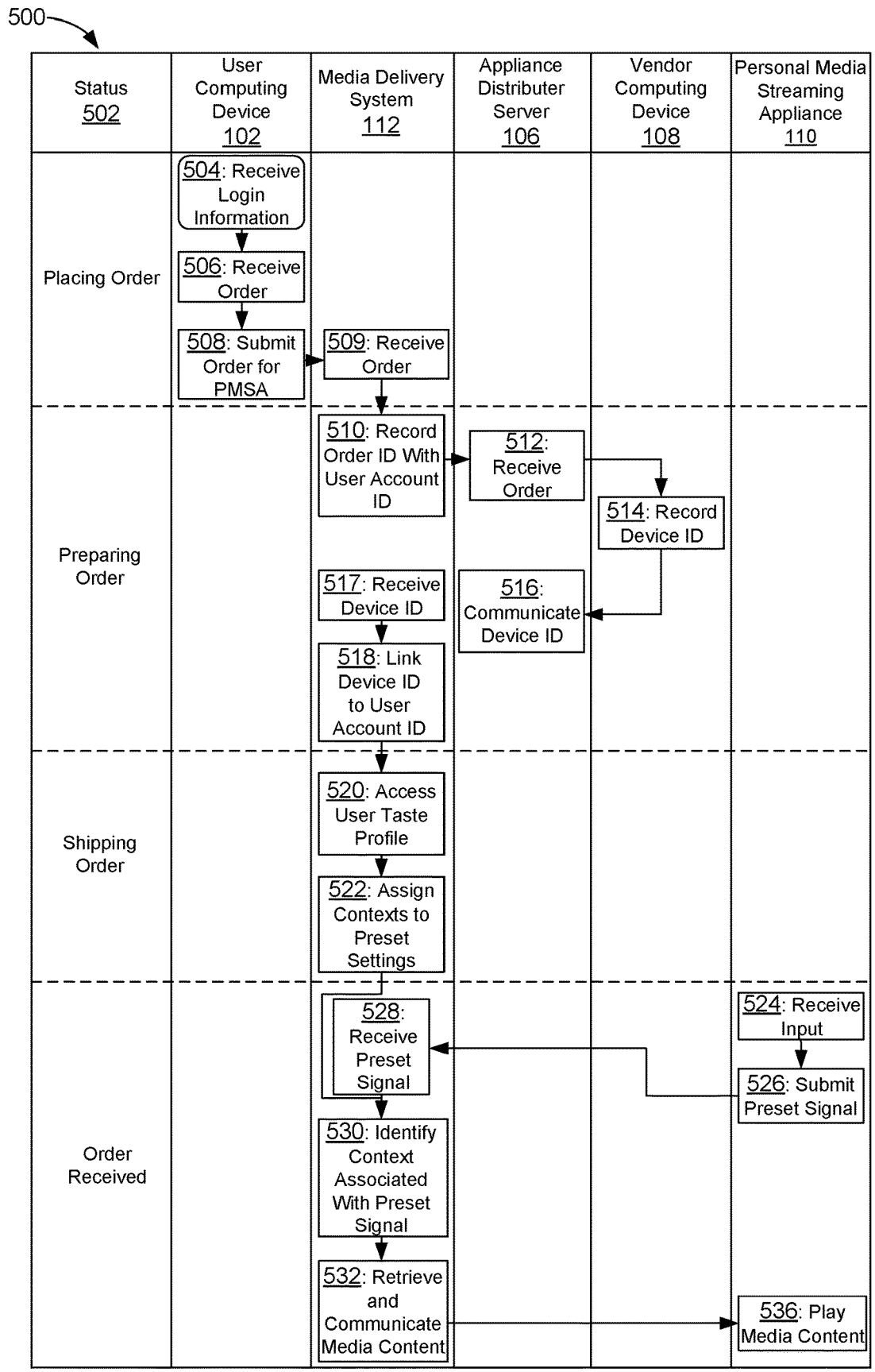
FIG. 8 is a flow diagram illustrating an example method of provisioning a PMSA system ordered in association with a user media streaming account.

FIG. 8 illustrates a method flowchart for a method 500 of provisioning a PMSA for use with a user media streaming account. The method 500 involves a user U placing an order for a PMSA 110 to be delivered to the user for use in the user's vehicle V. The user has an existing media streaming account or signs up for a media streaming account at the time that the user places the order for the PMSA 110. FIG. 8 shows the status 502 of the ordering and shipping process. The system involved in completing the steps of the method 500 include the user computing device 102, the media delivery system 112, the appliance distributor server 106, the vendor computing device 108, and the personal media streaming appliance 110. The status 502 indicates which steps of the method 500 are performed during "placing order," "preparing order," "shipping order," and "order received."

The method 700 begins when login information is received at the user computing device 102 at operation 504. The login information is received at the user computing device 102 through an input/output device 288. Examples of such input/output devices 288 include a keyboard, a mouse, and a touch screen. The login information includes at least a user account ID, such as the user account ID 930 described in FIG. 15.

At operation 506, input is received at the user computing device 102 for an appliance to be ordered. The input places an order for a PMSA 110 that is associated with a user media streaming account.

At operation 508, the user computing device 102 submits an order for a PMSA. The media delivery system 112 receives the order at operation 509. The order is assigned an order ID at the time of submission. The order ID and user account ID are included in the order.

At operation 510, the order ID is linked to the user's account ID and recorded at the media delivery system 112. In some embodiments, the linked order ID and account ID are stored in a table such as one of the tables in the data structure 700 of FIG. 11. The order information is then forwarded to the appliance distributor server 106.

At operation 512, the order is received at the appliance distributor server 106. The order for the PMSA 110 is prepared at a manufacturer or distributor warehouse. When a PMSA is ready to be shipped, a device ID for the PMSA 110 is recorded using a vendor computing device 108 at operation 514. The device ID is then communicated to the appliance distributor server 106.

At operation 516, the device ID is forwarded from the appliance distributor server 106 along with the order ID to the media delivery system 112.

At operation 517, the media delivery system 112 receives the device ID with the order ID. The device ID and order ID can be included in a confirmation message. In some embodiments, the confirmation message is received from the appliance distributor server 106. The device ID and order ID can be received at the media delivery system 112 from other sources such a carrier computing device. The media delivery system 112 links the device ID with the user account ID based on the common order ID at operation 518. The storage of the device ID is described further with respect to FIG. 11.

While the order for the PMSA 110 is shipping, the media delivery system 112 operates to set up the functionality of the PMSA 110 so that media content played at the PMSA 110 will be personalized to the user account when the PMSA 110 is first operated. At operation 520, the media delivery system 112 accesses the taste profile 242 of the user account associated with the user account ID. The taste profile 242 indicates which media contexts are most often utilized by the media streaming account. A media context can be one of an artist, an album, a playlist, and a radio station. The media delivery system 112 analyzes the taste profile 242 to identify media contexts.

At operation 522, the top contexts selected from the taste profile 242 are assigned to preset settings of the PMSA. Each preset setting of the PMSA is associated with a particular input that can be received from the PMSA. For example, an input may be pressing a preset button or turning the knob. A more detailed example of methods of assigning contexts to preset settings is described in FIG. 10.

In some embodiments, a confirmation message is received at the media delivery system 112 when the PMSA 110 is delivered at the address specified in the order. The confirmation message can be received from any source having information regarding the delivery status of the PMSA 110. For example, a carrier computing device or a user computing device 102 could be the source of the confirmation message.

At operation 524, input is received at the personal media streaming appliance 110 from a physical control. The PMSA 110 may be installed in a vehicle V. The physical control can be, for example, a preset button 412.

At operation 526, a preset signal 912 is submitted from the personal media streaming appliance 110 to the media delivery media system 112. The preset signal 912 is further described in FIG. 15.

At operation 528, the preset signal is received at the media delivery system 112. The media delivery system 112 processes the preset signal to determine which media context is associated with the preset signal 912.

At operation 530, the context associated with the input is identified at the media delivery system 112. In embodiments where the PMSA 110 is configured to play audio content, the context can be a music playlist, a podcast, an audiobook, an artist, an album, or a radio station.

At operation 532, the media delivery system 112 sends the media content associated with the selected context to the personal media streaming appliance 110.

At operation 534, the PMSA 110 receives the selected media content from the media delivery system 112.

At operation 536, the media delivery system 112 retrieves the media content associated with the context of the selected preset.

At operation 536, the media content from the selected context is played on the PMSA 110.

Figure 9:
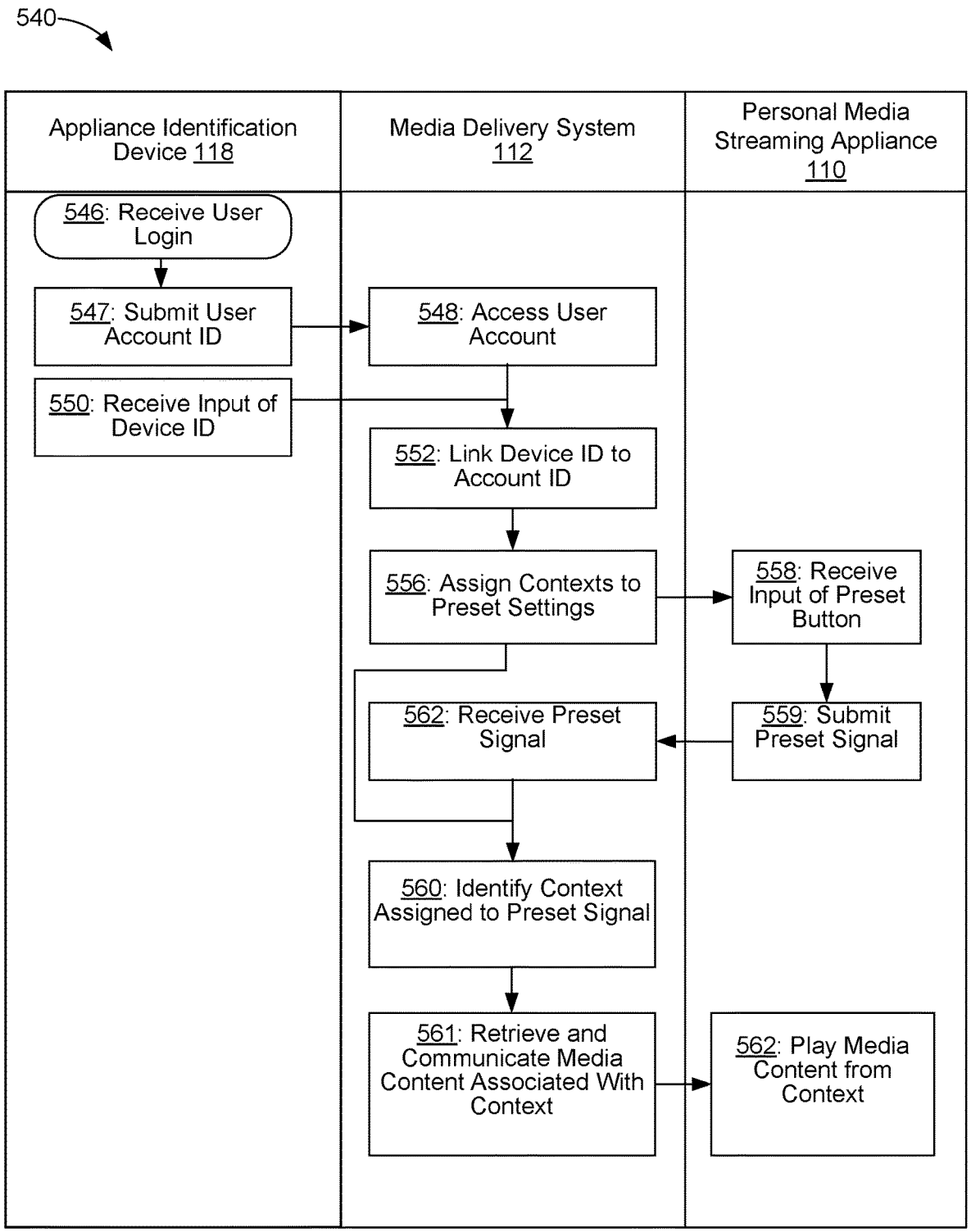
FIG. 9 is a flow diagram illustrating an example method of provisioning a PMSA system at the time of first use.

FIG. 9 illustrates a method flowchart for a method 540 of provisioning a PMSA for use with a user media streaming account. The method 540 involves a user U purchasing a PMSA 110 from a retailer rather than ordering through the media delivery system 112. The user has an existing media streaming account or signs up for a media streaming account at the time that the user purchases the PMSA 110. The system involved in completing the steps of the method 540 include an appliance identification device 102, 108, the media delivery system 112, and the personal media streaming appliance 110. The appliance identification device can be a user computing device 102 or a vendor computing device 108A, 108B, as shown in FIG. 1.

The method 540 begins when login information is received at the appliance identification device 102, 108 at operation 546. The user U may input the login information into the appliance identification device 102, 108 or an employee working for a retailer could input the login information for the user. Login information is received through an input/output device 288. Examples of such devices include a keyboard, a mouse, and a touch screen. The login information includes at least a user account ID, such as the user account ID 930 described in FIG. 15. In instances where the user does not already have a media streaming account, the user can set up a new account or an employee could assist the user with setting up an account.

At operation 547, a user account ID is submitted to the media delivery system 112 through the network 116. The user account ID is associated with a user media streaming account.

At operation 548, the media delivery system 112 receives the user account ID and accesses the user account. In some instances, a communication may be returned to the appliance identification device 102, 108 to confirm successful login and provide a prompt to add a new device to the user account.

At operation 550, input of a device ID is received at the appliance identification device 102, 108 and communicated to the media delivery system 112. The device ID is taken from a PMSA that is to be associated with a particular user's media streaming account. In some cases, the appliance identification device 102, 108 can include a bar code scanner to read a barcode with a unique identifier for the PMSA 110. In other instances, a camera could be used to capture a QR code or other unique identifying symbol on the PMSA 110 or its packaging. Alternatively or in addition to the scanning methods, the appliance identification device 102, 108 could receive characters representing the device ID through a keyboard, touchscreen, or other input device.

At operation 552, the media delivery system 112 receives the device ID. In some embodiments, the device ID is received from the appliance identification device 102, 108. The media delivery system 112 links the device ID with the user account ID. The storage of the device ID is described further with respect to FIG. 11.

Similar to the method 500 of FIG. 8, the media delivery system 112 operates to set up the functionality of the PMSA so that media content played at the PMSA will be personalized to the user account upon first operation of the PMSA 110. However, the set up steps may occur during a much shorter period of time because the PMSA 110 is not being shipped.

At operation 556, the media contexts are assigned to preset buttons 412 of the PMSA. Each preset setting of the PMSA is associated with a particular preset button. A more detailed example of methods of assigning contexts to preset buttons is described in FIG. 10.

At operation 558 an input of a preset button is received at the PMSA 110. A preset signal is submitted at operation 559. The preset signal is further described in FIG. 15.

At operation 562, the media delivery system 112 receives the preset signal. The preset signal includes at least a device ID and preset button ID. At operation 560, the information from the preset signal is used to identify a media context assigned to the preset button.

At operation 561, the media content associated with the media context is retrieved by the media delivery system 112 and communicated to the PMSA 110. The media content from the context assigned to the preset button is then played on the PMSA 110 at operation 562.

Figure 10:
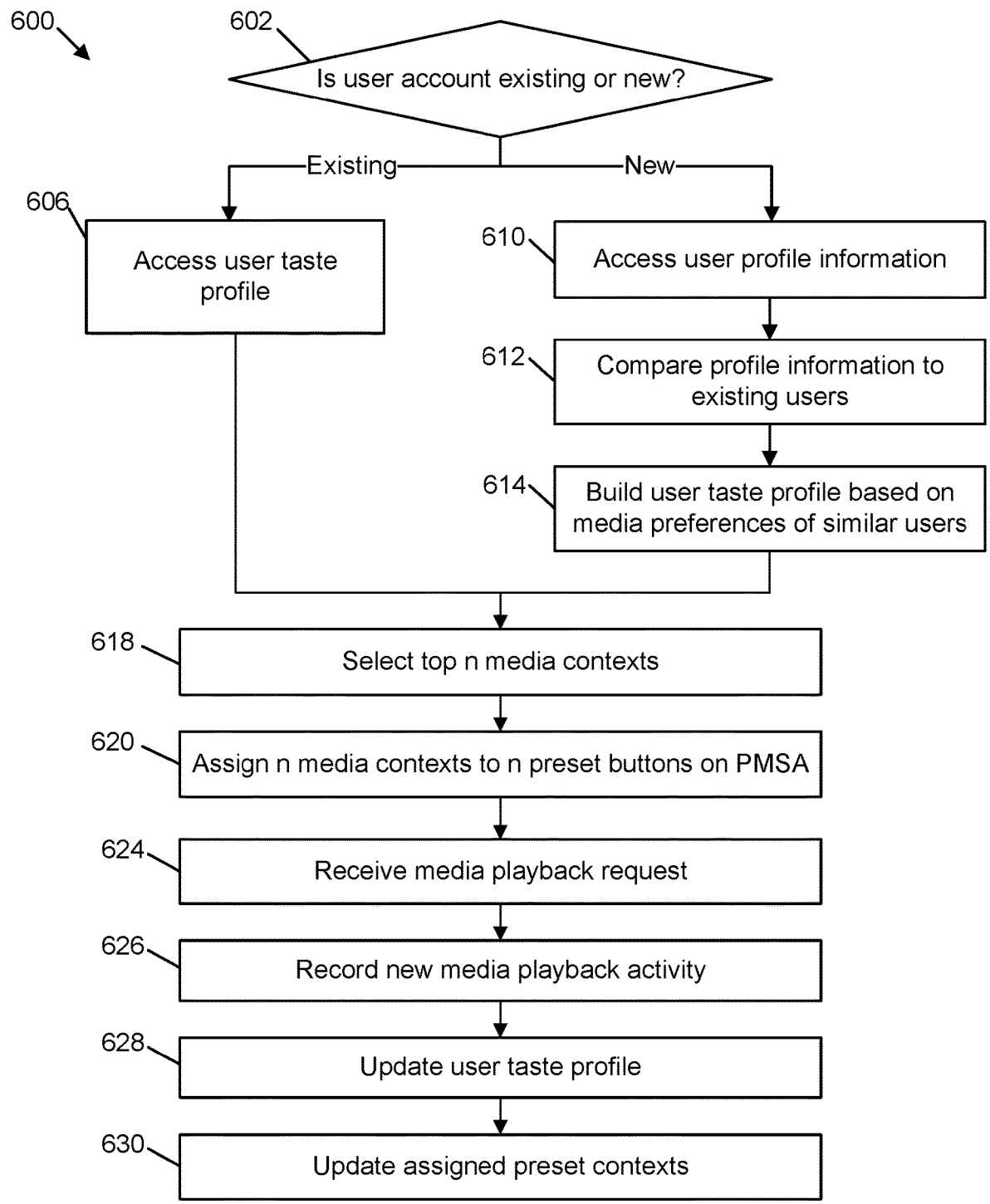
FIG. 10 is a flow diagram illustrating an example method of assigning media contexts to preset settings of a PMSA system.

FIG. 10 is a flow chart of an example method 600 of assigning media contexts to preset buttons on a PMSA associated with a user media streaming account.

At operation 602, the media delivery system 112 determines whether the user account is new or existing. New accounts may be made just before operating at PMSA 110, so there is no media playback history associated with the account. Existing user accounts typically have information reflecting past media consumption activity.

For existing user accounts, the method proceeds to operation 606 where a taste profile 242 is accessed at the media delivery system 112. The taste profiles may be accessed from the taste profile 242 data store within the media data store 226 of the media server application 212 as shown in FIG. 3. A taste profile 242 reflects media consumption preferences based on the media consumption history of an account. For example, a history of listening to particular types of music could indicate a preference for a particular musical genre or artist.

For new user accounts, the method proceeds to operation 610, where user profile information is accessed. When setting up a new media streaming account, a prompt is presented to enter at least a minimal amount of personal information for a user associated with the account. For example, such personal information could include one or more of a birth date, a gender, and a location. In some embodiments, a prompt is presented to provide information about media consumption preferences through the use of a survey. For example, a prompt might request selection of favorite music genres from a list. In another embodiment, a prompt is presented to log into a social media account to allow the media streaming account to access information from the social media account. Information from the social media account could be used to determine media consumption preferences.

At operation 612, the new profile information is compared to profile information from existing accounts of the media streaming service. The media consumption activity of user accounts having similar profile information is analyzed to determine which media contexts are preferred.

At operation 614, the media consumption activity of similar user accounts is utilized to build a taste profile 242 for the new user account.

Regardless of whether the user account is new or existing, the method then proceeds to operation 618. The top "n" media contexts from the taste profile are selected. "n" is a number that matches the number of preset buttons on a PMSA 110 that is associated with the user's media streaming account. For example, if the PMSA 110 has four preset buttons 412 as shown in FIG. 6, four media contexts would be selected. The "top" media contexts can be selected based on media contexts that are used the most often by the user. Alternative methods of ranking are possible such as the most recently played media contexts, or contexts that are most frequently saved to the user account.

At operation 620, the media contexts are assigned to the preset buttons 412 on the PMSA 110. The media context assignments are stored at the media delivery system 112 in the PMSA preset data 259 store.

Figure 11:
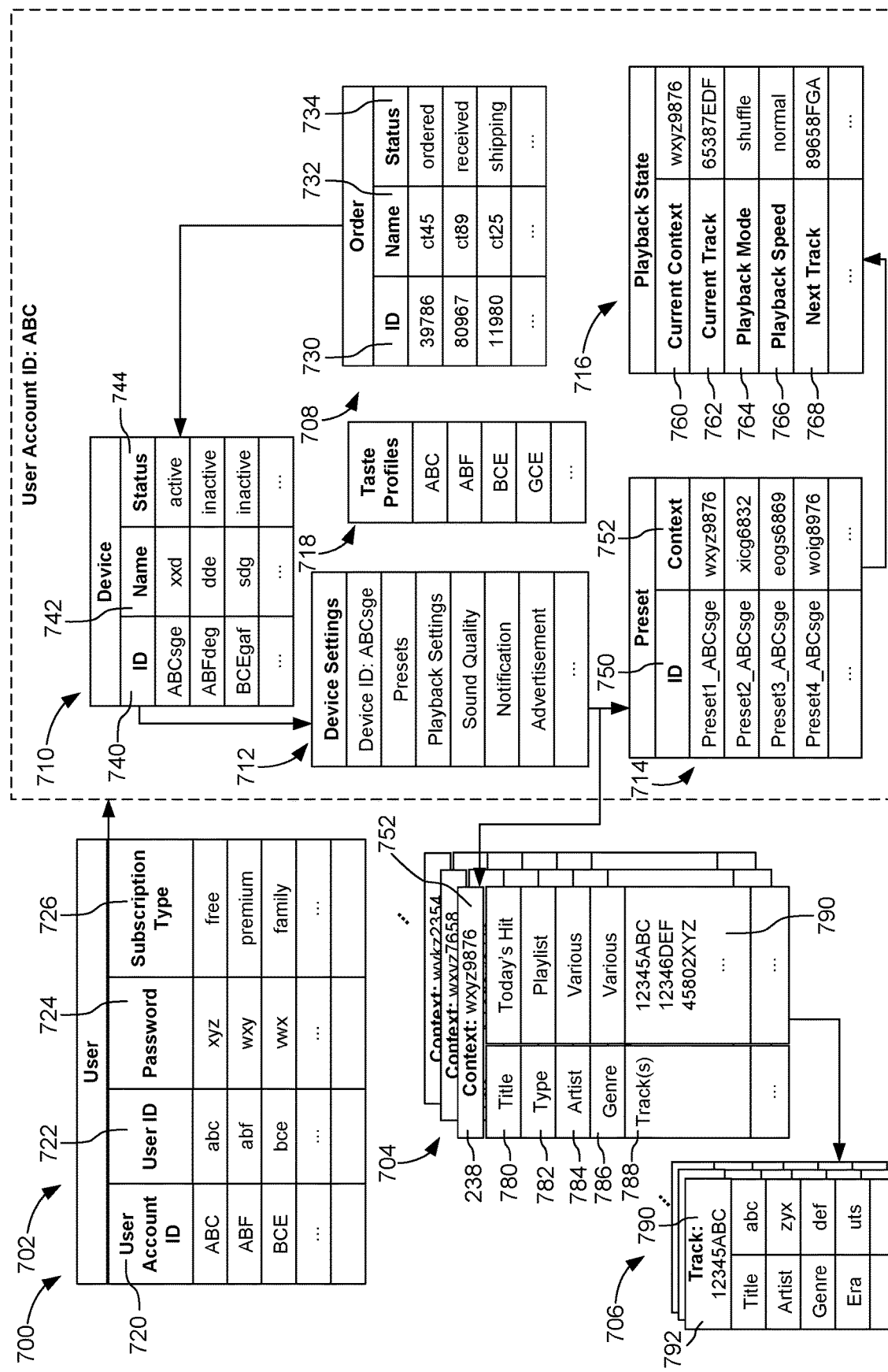
FIG. 11 illustrates an example data structure of a database of the media delivery system of FIG. 1.

FIG. 11 illustrates an example data structure 700 that may appear in a database of the media delivery system 112 such as the user accounts 240 database within the media server application 212 or the PMSA preset data 259 within the personal media streaming appliance server application 250 as shown in FIG. 3. In this embodiment, the data in the media delivery system 112 may be represented with a plurality of tables which identifies a rational nature of the database according to the embodiment of the present disclosure. However, in alternative embodiments, the data stored in the media delivery system 112 may also be implemented using other database models.

In the illustrated example, the data structure 700 includes a user account table 702, a media context table 704, and a media content item table 706. For each user account, the data structure 700 includes an order data table 708, a device data table 710, a device setting table 712, a preset table 714, a playback state table 716, and a taste profile table 718.

The user account table 702 can be configured to include data usable to identify users associated with user accounts of the media delivery system 112 (e.g., a media content provider or a media streaming service). In some embodiments, the user account table 702 can be used to store and identify the user accounts 240 as described with reference to FIG. 3. In some embodiments, the user account table 702 can reference one or more other tables, and/or be referenced by one or more other tables. Some embodiments of the user account table 702 can contain a field for user account identifiers (IDs) 720, a field for user identifiers (IDs) 722, a field for passwords 724, and a field for subscription types 726.

The user account ID field identifies a plurality of user account IDs 720 associated with the user accounts of the media delivery system 112.

The user ID field identifies user IDs 722 associated with the user accounts.

The password field identifies passwords 724 associated with the user accounts.

The subscription type field identifies subscription types 726 associated with the user accounts. Examples of the subscription types 726 include a free subscription and a fee-based subscription with a single tier or with multiple tiers. Such a fee-based subscription can provide services that the free subscription does not provide.

In other embodiments, the user account table 702 can contain additional fields, such as biographical information (e.g., address, contact information, age, gender, birth date/year, family, relationships, work, education, etc.). It is noted that, where user data is used, it can be handled according to a defined privacy policy. User data can be handled in an anonymized matter.

Referring still to FIG. 11, each user account that can be identified in the user account table 702 is associated with, and identifies, a set of data for providing various services from the media delivery system 112. In some embodiments, such a set of data includes an order data table 708, device data table 710, a device setting table 712, a preset table 714, a playback state table 716, and a taste profile table 718. In the illustrated example, the tables 708, 710, 712, 714, 716, and 718 are primarily described to be associated with a single user account (e.g., User Account ID: ABC). However, it is understood that, in other embodiments, the tables 708, 710, 712, 714, 716, and 718 can be structured to be associated with a plurality of user accounts The order data table 708 identifies one or more orders associated with a particular user account. (e.g., User Account ID: ABC in FIG. 9). The orders are generally for PMSA devices. In some embodiments, the order data table 708 can be referenced by the user account table 702. Other tables can reference the order data table 708. The order data table 708 can also reference one or more other tables. The order data table 708 can contain a field for order identifiers (IDs) 730, a field for device names 732, and a field for order status 734. The order IDs 730 can include an order confirmation number or other unique identifiers. The device names 732 correspond to devices involved in the order. The status 734 indicates the latest event that has occurred in the order fulfillment process. For example, the order status 734 can indicate whether the device has been ordered, has shipped, or has been delivered.

The device data table 710 identifies one or more devices associated with a particular user account. In some embodiments, the device data table 710 can be referenced by the user account table 702. Other tables can reference the device data table 710. The device data table 710 can also reference one or more other tables. The device data table 710 can contain a field for device identifiers (IDs) 740, a field for device names 742, and a field for device status 744. The device ID field includes one or more device IDs 740 of one or more media playback devices that are associated with the particular user account.

In some embodiments, a plurality of media playback devices, such as the PMSA 110, the computing device, and other computing devices, can be respectively used to access media content service from the media delivery system 112 which is associated with a single user account. For example, different media playback devices, such as the PMSA 110 and the user computing device 102, can receive inputs of login information. The media content service associated with the user account can be provided to one or more of the media playback devices that have received login information associated with the same user account.

The device name field includes one or more device names 742 associated with the device IDs 740. The device status field identifies a device status 744 for each of the media playback devices identified in the device data table 710. In some embodiments, the device status can be either active or inactive. When the device status of a media playback device is active, the media playback device is in operation and accessible by the media delivery system 112 via the network 116. When the device status of a media playback device is inactive, the media playback device is not in operation and thus inaccessible by the media delivery system 112 via the network 116.

The device setting table 712 includes information about settings that are configurable in one or more particular media playback devices. In some embodiments, the device setting table 712 can be referenced by the device data table 710. Other tables can reference the device setting table 712. The device setting table 712 can reference one or more other tables. In the illustrated example, the device setting table 712 indicates that the media playback device identified by the device ID ("ABCsge") has various settings, such as presets, playback settings, sound quality, notification, advertisement, and other user-configurable settings.

The preset table 714 includes information about presets associated with one or more particular media playback devices. In some embodiments, the preset table 714 can be referenced by the device setting table 712. Other tables can also reference the preset table 714. The preset table 714 can reference one or more other tables. In the illustrated example, the preset table 714 contains information about the presets provided in the media playback device identified by the device ID ("ABCsge").

Some embodiments of the preset table 714 include a field for preset identifiers (IDs) 750 and a field for media context identifiers (IDs) 752. The preset ID field contains one or more preset identifiers (IDs) 750 that identify presets provided in the particular media playback device. The context ID field contains one or more media context identifiers 752 associated with the preset identifiers 750, respectively. The media context identifiers 752 are used to identify media contexts 238, as described herein. In some embodiments, a media context identifier is configured as a Uniform Resource Identifier (URI).

In the illustrated examples of FIG. 6, the PMSA 110 includes the preset buttons 412, and the preset buttons 412 can be identified by the preset identifiers 750. As the preset identifiers 750 are associated with the media context identifiers 752 that identify media contexts, the preset buttons 412 in the PMSA 110 can be used to retrieve the media contexts identified by the media context identifiers 752.

The playback state table 716 includes information about playback of one or more media contexts 238. In some embodiments, where a plurality of media playback devices may be used to play media content associated with a particular user account, only one of the plurality of media playback devices can be used to play the media content while the other media playback devices may not be used to play the same media content simultaneously. In these embodiments, the playback state table 716 is configured to indicate playback information of the media content that is in common among the plurality of media playback devices associated with the particular user account. In other embodiments, the playback state table 716 is configured to indicate playback information for each of the media playback devices associated with the particular user account, where the media playback devices may be used independently to play media content in different manners.

In some embodiments, the playback state table 716 contains a current context 760, a current media content item (i.e., a current track) 762, a playback mode 764, a playback speed 766, and a next media content item (i.e., a next track) 768. In addition or alternatively, the playback state table 716 can contain other playback-related information. In some embodiments, the playback state table 716 can reference one or more other tables, and/or be referenced by one or more other tables. The current context 760 indicates a media context 238 that is being currently played in a media playback device. The current media content item 762 indicates a media content item that is being currently played from the current context 760. The playback mode 764 indicates a playback mode that is currently selected. Examples of the playback mode include a normal playback mode, a repeat playback mode, and a shuffle playback mode. The playback speed 766 indicates a playback speed that is currently selected. Examples of the playback speed include a normal playback speed, one or more faster playback speeds, and one or more slower playback speeds. The next media content item 768 indicates a media content item that is in queue and will be subsequently played after the current media content item 762.

Referring still to FIG. 11, the taste profile table 718 is configured to identify a taste profile 242 (FIG. 3) associated with the particular user account. In some embodiments, the taste profile table 718 can be referenced by the user account table 702. Other tables can reference the taste profile table 718. The taste profile table 718 can also reference one or more other tables.

With reference still to FIG. 11, the media context table 704 is configured to identify one or more media contexts 238 as described with reference to FIG. 3. As illustrated, some embodiments of the media context table 704 can respectively identify a media context 238 by a media context identifier 752. The media context table 704 contains various pieces of information about a corresponding media context 238. Examples of such information include a media context title 780, a media context type 782, a media context artist 784, a media context genre 786, and a list of media content items 788 associated with the media context 238. Other information can also be included in the media context table 704.

The media context title 780 indicates a title of the media context 238. The media context type 782 indicates a type of the media context 238, such as a playlist, an album, an artist, and a track. The media context artist 784 indicates one or more artists associated with the media context 238. The media context genre 786 indicates a genre associated with the media context 238. The list of media content items 788 indicates one or more media content items (i.e., tracks) associated with the media context 238. Each of the media content items can be identified by a track identifier 790. In some embodiments, one or more of the media content items 234, as described with reference to FIG. 3, are identified by the list of media content items 788.

The media content item table 706 is configured to identify one or more media content items (i.e., tracks) 792 by the track identifiers 790. In some embodiments, a track identifier is configured as a Uniform Resource Identifier (URI). In some embodiments, one or more of the media content items 792 are selected from the media content items 234 as described with reference to FIG. 3. The media content item table 706 can further include various attributes about the media content item 792, such as a media content item title, artist identification (e.g., individual artist name or group name, or multiple artist names or group names), genre, era, and other attributes of the media content item.

Figure 12:
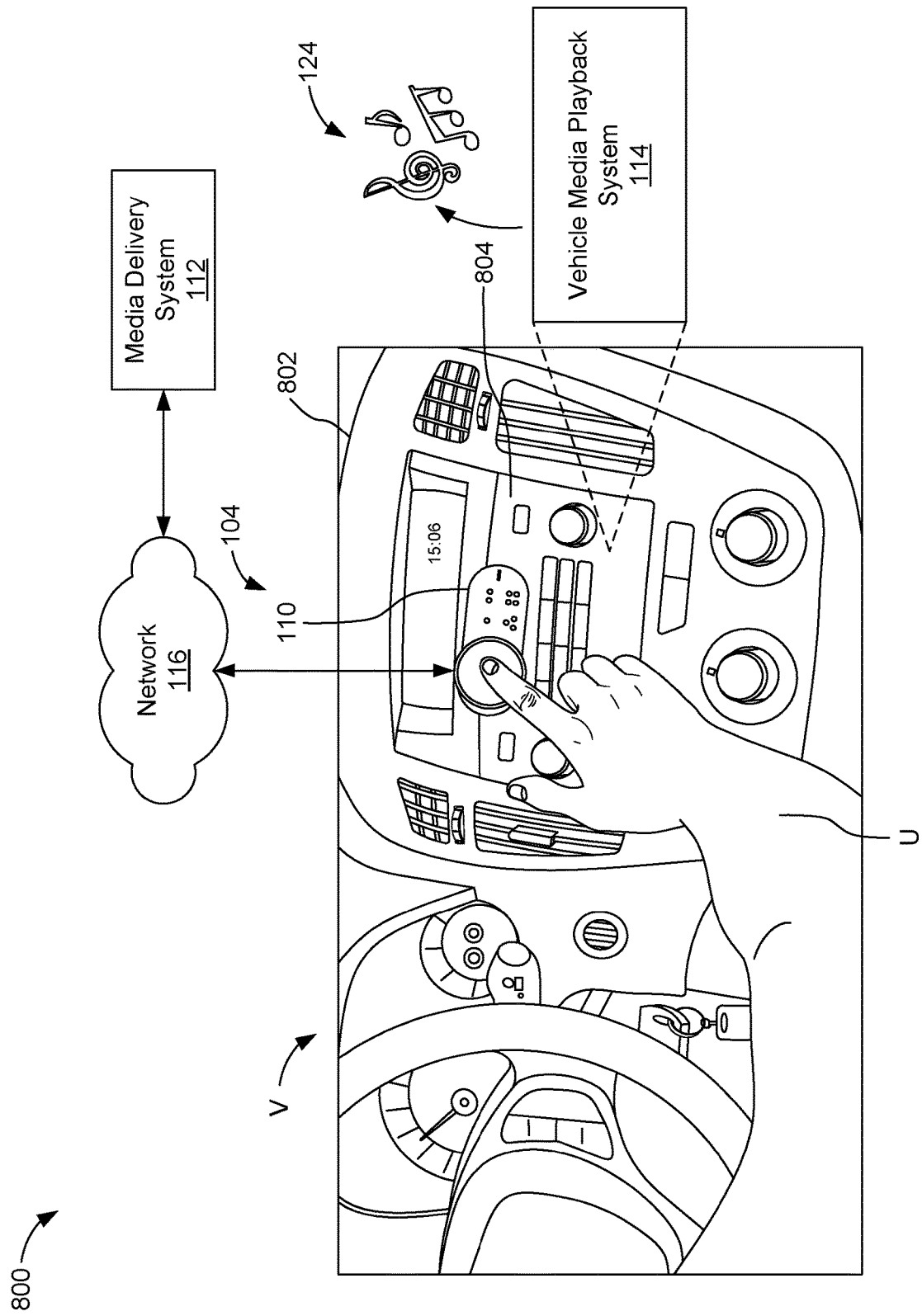
FIG. 12 illustrates an example system for streaming media content for playback in a vehicle.

FIG. 12 illustrates an example environment 800 in which a PMSA 110 system is operated in a vehicle V to stream media content for playback. The vehicle V includes a dashboard 802 or a head unit 804. The environment 800 includes one or more media playback devices configured to play media content, such as a personal media streaming appliance (PMSA) system 110 and a vehicle media playback system 114. The environment 800 further includes a data communication network 116.

In the example of FIG. 12, a user has received a new PMSA 110 and has mounted the portable device inside of the vehicle V. In this example, the PMSA 110 is mounted to the head unit 804 of the vehicle V, but could also be mounted to the dashboard 802. In other embodiments, the PMSA system 110 can be configured to be built in a structure of the vehicle V.

The PMSA 110 is configured to receive media content personalized to the user account as soon as the PMSA 110 is powered on. In some embodiments, input is received from actuation of a preset button 412 on the PMSA 110. Receiving input from a button triggers the PMSA 110 to retrieve media content and/or setting information. This process is described further with respect to FIG. 14.

The vehicle media playback system 114 operates to receive media content from the PMSA system 110 and generates a media output 124 to play the media content in the vehicle V. An example of the vehicle media playback system 114 is illustrated and described in further detail herein, such as with reference to FIG. 13.

Figure 13:
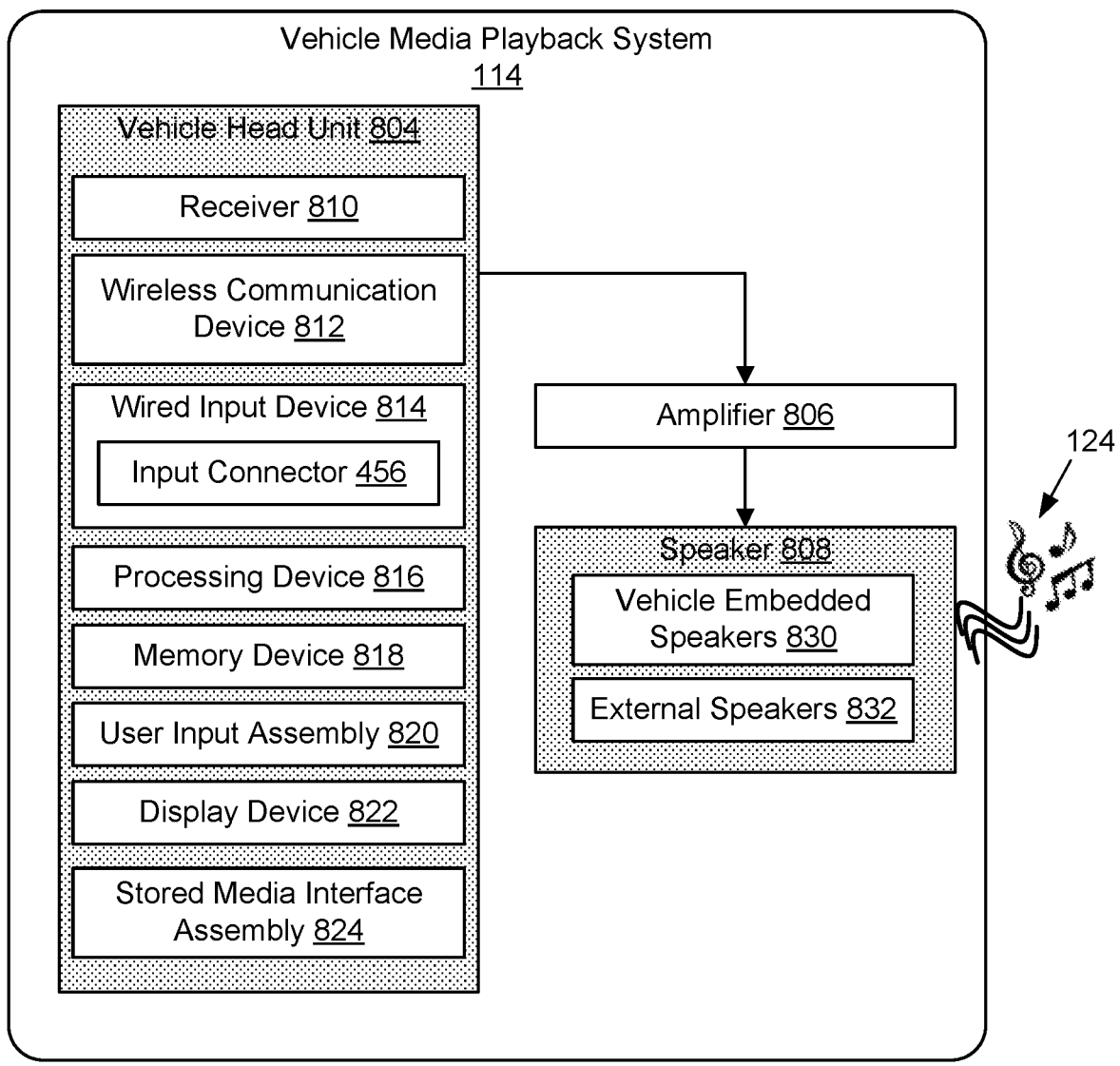
FIG. 13 is a block diagram of an example embodiment of the vehicle media playback system of FIG. 12.

FIG. 13 is a block diagram of an example embodiment of the vehicle media playback system 114. In this example, the vehicle media playback system 114 includes a vehicle head unit 804, an amplifier 806, and a speaker 808.

The vehicle head unit 804 is configured to receive input and generate media content from various sources. In this example, the vehicle head unit 804 includes a receiver 810, a wireless communication device 812, a wired input device 814, a processing device 816, a memory device 818, an input assembly 820, a display device 822, and a stored media interface assembly 824.

The receiver 810 operates to receive media content signals from various external sources. The received signals can then be used to generate media output by the vehicle media playback system 114. Some embodiments of the receiver 810 include one or more tuners for receiving radio signals such as FM or AM radio signals. Other embodiments of the receiver 810 include a receiver for receiving satellite radio signals and/or a receiver for receiving internet radio signals.

The wireless communication device 812 operates to communicate with other devices using wireless data signals. The wireless communication device 812 can include one or more of a Bluetooth transceiver and a Wi-Fi transceiver. The wireless data signal may comprise a media content signal such as an audio or video signal. In some embodiments, the wireless communication device 812 is used to enable the vehicle media playback system 114 to wirelessly communicate with the PMSA system 110 and receive the media content signal 164 (FIG. 2) from the PMSA system 110 via an in-vehicle wireless network.

The wired input device 814 provides an interface configured to receive a cable for providing media content and/or commands. The wired input device 814 includes an input connector 456 configured to receive a plug extending from a media playback device for transmitting a signal for media content. In some embodiments, the wired input device 814 can include an auxiliary input jack (AUX) for receiving a plug from a media playback device that transmits analog audio signals. The wired input device 814 can also include different or multiple input jacks for receiving plugs from media playback devices that transmit other types of analog or digital signals (e.g., USB, HDMI, Composite Video, YPbPr, DVI). In some embodiments, the wired input device 814 is also used to receive instructions from other devices.

In some embodiments, the wired input device 814 provides the input connector 456 (e.g., an AUX port) for receiving a connector 452 extending from the PMSA system 110, as illustrated in FIG. 6. The media content signal 164 is then transmitted from the PMSA system 110 to the vehicle media playback system 114 via the cable 450, the connector 452, and the input connector 456.

The processing device 816 operates to control various devices, components, and elements of the vehicle media playback system 114. The processing device 816 can be configured similar to the processing device 148 (FIG. 2) and, therefore, the description of the processing device 816 is omitted for brevity purposes.

In some embodiments, the processing device 816 operates to process the media content signal 164 received from the PMSA system 110 and convert the signal 164 to a format readable by the vehicle media playback system 114 for playback.

The memory device 818 is configured to store data and instructions that are usable to control various devices, components, and elements of the vehicle media playback system 114. The memory device 818 can be configured similar to the memory device 150 (FIG. 2) and, therefore, the description of the memory device 818 is omitted for brevity purposes.

The user input assembly 820 includes one or more input devices for receiving user input from users for controlling the vehicle media playback system 114. In some embodiments, the input assembly 820 includes multiple knobs, buttons, and other types of input controls for adjusting volume, selecting sources and content, and adjusting various output parameters. In some embodiments, the various input devices are disposed on or near a front surface of the vehicle head unit 804. The various input devices can also be disposed on the steering wheel of the vehicle or elsewhere. Additionally or alternatively, the input assembly 820 can include one or more touch sensitive surfaces, which can be incorporated in the display device 822.

The display device 822 displays information. In some embodiments, the display device 822 includes a liquid crystal display (LCD) panel for displaying textual information about content and/or settings of the vehicle media playback system 114. The display device 822 can also include other types of display panels such as a light emitting diode (LED) panel. In some embodiments, the display device 822 can also display image or video content.

The stored media interface assembly 824 reads media content stored on a physical medium. In some embodiments, the stored media interface assembly 824 comprises one or more devices for reading media content from a physical medium such as a compact disc or cassette tape.

The amplifier 806 operates to amplify a signal received from the vehicle head unit 804 and transmits the amplified signal to the speaker 808. In this manner, the media output 124 can be played back at a greater volume. The amplifier 806 may include a power source to power the amplification.

The speaker 808 operates to produce an audio output (e.g., the media output 124) based on an electronic signal. The speaker 808 can include one or more vehicle embedded speakers 830 disposed at various locations within the vehicle V. In some embodiments, separate signals are received for at least some of the speakers (e.g., to provide stereo or surround sound).

In other embodiments, the speaker 808 can include one or more external speakers 832 which are arranged within the vehicle V. One or more external speakers 832 can be connected to the vehicle head unit 804 using a wired interface or a wireless interface. In some embodiments, the external speakers 832 can be connected to the vehicle head unit 804 using Bluetooth. Other wireless protocols can be used to connect the external speakers 832 to the vehicle head unit 804. In other embodiments, a wired connection (e.g., a cable) can be used to connect the external speakers 832 to the vehicle head unit 804. Examples of the wired connection include an analog or digital audio cable connection and a universal serial bus (USB) cable connection. The external speaker 832 can also include a mechanical apparatus for attachment to a structure of the vehicle.

Figure 14:
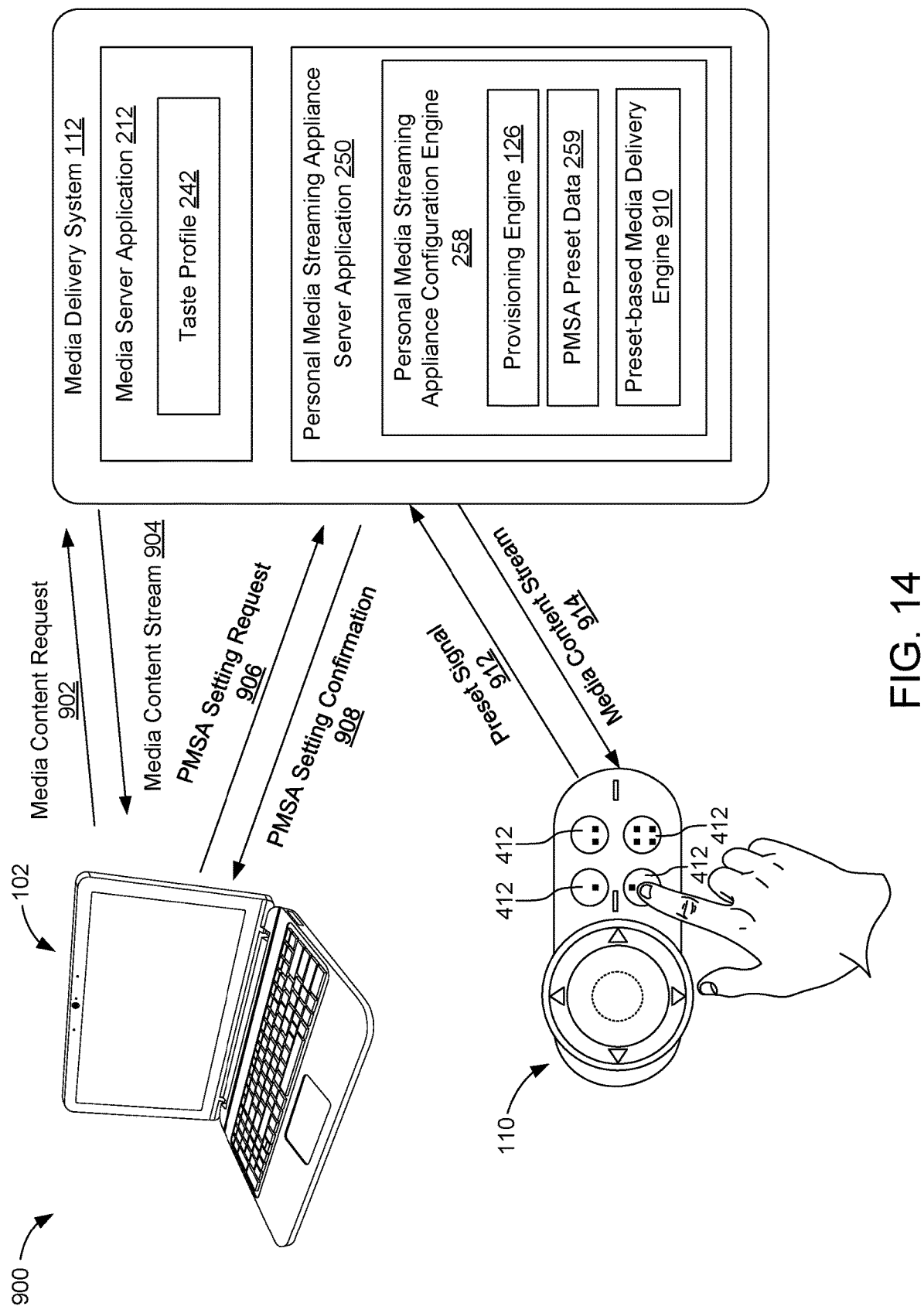
FIG. 14 illustrates an example ecosystem for the PMSA system of FIG. 1.

FIG. 14 illustrates an example ecosystem 900 for the PMSA system 110 of FIG. 1. In some embodiments, the ecosystem 900 is implemented at least in part with the system 100 as illustrated and described in FIG. 1. For example, the ecosystem 900 includes the PMSA system 110, the media delivery system 112, and a user computing device 102. As described herein, the PMSA system 110, the media delivery system 112, and the user computing device 102 can be in data communication via the network 116 as illustrated in FIG. 1.

In some embodiments, the ecosystem 900 is configured to provide personalized media content to the PMSA 110 before first operation of the PMSA 110. At the time the PMSA 110 is ordered, the media delivery system 112 assigns media contexts to each of a plurality of preset buttons 412, as discussed in FIG. 10. Updates can be made to the contexts selected for each preset button 412 based on one or both of new media consumption through the user's media streaming account, and changes made to the settings of the PMSA in response to inputs received from a user computing device 102. These updates can be made up until the moment that the PMSA 110 is first powered on.

The user computing device 102 includes the music playback application 294 as described with reference to FIGS. 1 and 4. The music playback application 294 includes a user interface operable to request media content for playback on the user computing device 102. A media content request 902 is communicated to the media delivery system 112. The media server application 212 generates a media content stream 904 that is communicated back to the user computing device 102 for playback. The media content request 902 is analyzed and used to update the taste profile 242.

The music playback application 294 includes user settings 296 that can be modified through the user interface 298. Inputs are received through the user interface 298 to modify user settings 296. The user settings 296 can include settings for the PMSA 110. When a PMSA setting is modified at the music playback application 294, a PMSA setting request 906 is communicated to the media delivery system 112. The personal media streaming appliance configuration engine 258 receives the request and updates the PMSA preset data 259 for the appliance associated with the user account. Then personal media streaming appliance server application 250 returns a PMSA setting confirmation 908 to the user computing device 102.

Referring still to FIG. 14, the media delivery system 112 includes the media server application 212 and the PMSA server application 250 (as described also in FIG. 3). The PMSA server application 250 can include the PMSA configuration engine 258 which includes an appliance provisioning engine 126 and PMSA preset data 259.

In some embodiments, the PMSA configuration engine 258 operates to receive the PMSA setting request 906 from the computing device 102 and update the PMSA preset data 259. The PMSA configuration engine 258 continually updates the PMSA preset data 259 as each taste profile 242 is updated. As media content is played on the user computing device 102, the media server application 212 updates the taste profile 242. The personal media streaming appliance configuration engine 258 then updates the PMSA preset data 259. The PMSA preset data 259 includes assignments of media contexts to preset buttons 412. In embodiments where the PMSA has been ordered for delivery, the PMSA preset data 259 is updated up until the point when the PMSA 110 is first powered on. The PMSA 110 is configured to receive the PMSA preset data 259 upon receiving a command to power on.

The appliance provisioning engine 126 operates to ensure that the PMSA 110 and its settings are linked to the correct user streaming account. The link provided by the appliance provisioning engine 126 is utilized to determine which settings and media content are communicated to the PMSA 110 when it is first powered on.

Upon powering on the PMSA 110, some preset data, media content, and/or configuration information may be immediately communicated from the media delivery system 112 to the PMSA 110. In other embodiments, the media delivery system 112 stores all of the configuration data and media content for the PMSA 110 in the cloud.

The preset-based media delivery engine 910 of the media delivery system 112 operates to determine media content associated with one or more of the preset buttons 412 of the PMSA system 110. In some embodiments, the preset-based media delivery engine 910 operates to receive a preset signal 912 from the PMSA system 110 and determine which media content context is associated with the corresponding preset signal 912 and user account. The preset signal 912 is further described in FIG. 15. In some embodiments, the preset signal 912 is generated at the PMSA system 110 upon receiving an input of selecting a preset button 412. In these embodiments, the selection (or activation) of the preset button 412 is regarded as a preset signal source. The preset signal 912 can include information that identifies the preset button 512 selected at the PMSA system 110. The preset signal 912 is used by the preset-based media delivery engine 910 to identify media content associated with the preset button 412.

When the media delivery system 112 identifies the media content based on the preset signal 912, the media delivery system 112 transmits a media content stream 914 to the PMSA system 110 for playback.

Figure 15:
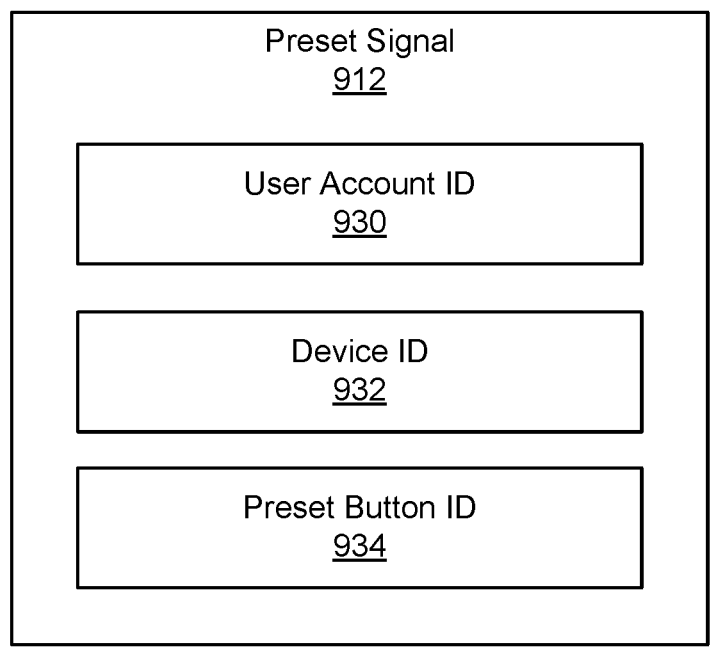
FIG. 15 is a block diagram of the preset signal of FIG. 14.

FIG. 15 is a block diagram that illustrates an example of the preset signal 912 of FIG. 14. In some embodiments, the preset signal 912 includes user account ID 930, device ID 932, and preset button ID 934.

The user account information 930 includes information that identifies user accounts that are associated with PMSA systems 110. In some embodiments, the user account information 930 includes user account identifiers for identifying the user accounts that match the respective PMSA systems 110. A user account identifier can be a string of numbers and/or letters that identify a user account. An example of the user account information 930 is illustrated and described in more detail with reference to FIG. 11.

In some embodiments, when the media delivery system 112 receives the preset signal 912, the media delivery system 112 can retrieve the user account information 930 and determine a user account that matches the preset signal 912. For example, the PMSA setting request 606 can include a user account identifier that identifies a user account associated with the PMSA system 110, and the media delivery system 112 can process the preset signal 912 and look up the user account information 930 to determine which user account in the user account information 930 is associated with the PMSA system 110.

In other embodiments, the preset signal 912 does not include user account ID 930. The media delivery system 112 can rely on the device ID 932 to look up the account with which the PMSA system 110 is associated.

The device ID 932 includes information that identifies one or more PMSA systems 110. In some embodiments, the device ID 932 includes device identifiers for identifying PMSA systems 110. A device identifier can be a string of numbers and/or letters that identify a PMSA system. An example of the device ID 932 is illustrated and described in more detail with reference to FIG. 11.

The preset button ID 934 includes information about the preset buttons 412 of the PMSA systems 110, such as preset identifiers that identify the preset buttons 412. A preset identifier can be a string of numbers and/or letters that identify a preset button. In some embodiments, the preset button ID 934 further includes media content that is associated with the preset buttons 412. An example of the preset button ID 934 is illustrated and described in more detail with reference to FIG. 11.

Figure 16:
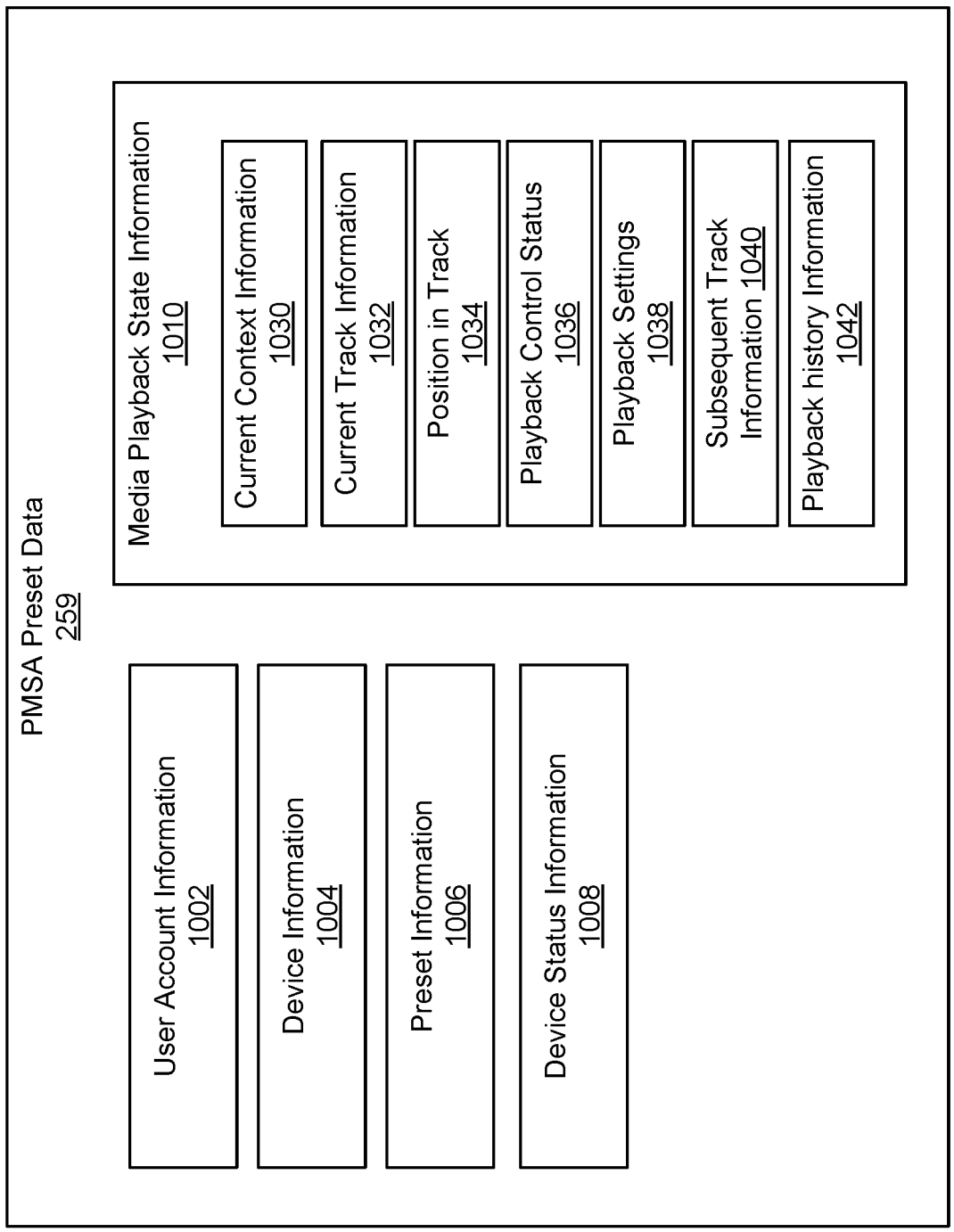
FIG. 16 is a block diagram of the PMSA preset data of FIG. 14.

FIG. 16 is a block diagram that illustrates an example of the PMSA preset data 259 of FIG. 14. In some embodiments, the PMSA preset data 259 include user account information 1002, device information 1004, preset information 1006, device status information 1008, and media playback state information 1010.

The PMSA preset data 259 include information associated with the preset buttons 412 of the PMSA system 110. In some embodiments, the PMSA preset data 259 includes information for a plurality of PMSA systems 110 and can be used by the media delivery system 112 to control the plurality of PMSA systems 110. In other embodiments, the PMSA preset data 259 can be dedicated to a single PMSA system 110 or a limited group of PMSA systems.

The user account information 1002 includes information that identifies user accounts that are associated with PMSA systems 110, respectively. In some embodiments, the user account information 1002 includes user account identifiers for identifying the user accounts that match the respective PMSA systems 110. A user account identifier can be a string of numbers and/or letters that identify a user account. An example of the user account information 1002 is illustrated and described in more detail with reference to FIG. 11.

In some embodiments, when the media delivery system 112 receives the preset signal 912, the media delivery system 112 can retrieve the user account information 1002 and determine a user account that matches the preset signal 912. For example, the preset signal 912 can include a user account identifier that identifies a user account associated with the PMSA system 110, and the media delivery system 112 can process the preset signal 912 and look up the user account information 1002 to determine which user account in the user account information 1002 is associated with the PMSA system 110.

The device information 704 includes information that identifies one or more PMSA systems 110. In some embodiments, the device information 704 includes device identifiers for identifying PMSA systems 110. A device identifier can be a string of numbers and/or letters that identify a PMSA system. An example of the device information 704 is illustrated and described in more detail with reference to FIG. 11.

In some embodiments, when the media delivery system 112 receives the preset signal 912, the media delivery system 112 can retrieve the device information 1004 and determine a device identifier that matches the preset signal 912. For example, the preset signal 912 can include a device identifier that identifies the PMSA system 110, and the media delivery system 112 can process the preset signal 912 and look up the device information 1004 to determine which PMSA system matches the device identifier included in the preset signal 912.

The preset information 1006 includes information that identifies one or more preset buttons 412 of PMSA systems 110. In some embodiments, the preset information 1006 includes preset identifiers for identifying preset buttons of PMSA systems 110. A preset identifier can be a string of numbers and/or letters that identify a preset button of a PMSA system. An example of the preset information 1006 is illustrated and described in more detail with reference to FIG. 11.

In some embodiments, when the media delivery system 112 receives the preset signal 912, the media delivery system 112 can retrieve the preset information 1006 and determine a preset button identifier that matches the preset signal 912. For example, the preset signal 912 can include a preset button identifier that identifies a preset button of a PMSA system 110. The media delivery system 112 can process the preset signal 912 to look up the preset information 1006. The preset information 1006 is used to determine which preset button matches the preset button identifier included in the preset signal 912.

The device status information 1008 includes information about statuses of PMSA systems 110. Each of the PMSA systems 110 can be in either an active state or an inactive state. In some embodiments, when a PMSA system 110 is in an active state, the PMSA system 110 is in operation and accessible by the media delivery system 112 via the network 116. When a PMSA system 110 is in an inactive state, the PMSA system 110 is not in operation and inaccessible by the media delivery system 112 via the network 116.

The media playback state information 1010 includes information about media content playback via PMSA systems 110. In some embodiments, the media playback state information 1010 is provided for each user account. In other embodiments, the media playback state information 1010 is provided for each media playback device. In yet other embodiments, the media playback state information 1010 is provided for each media context. In still other embodiments, the media playback state information 1010 is provided for each media content item.

In some embodiments, the media playback state information 1010 includes current context information 1030, current track information 1032, current position-in-track information 1034, playback control status information 1036, playback settings information 1038, subsequent track information 1040, and playback history information 1042.

The current context information 1030 includes information about a media context that is being currently played.

The current track information 1032 includes information about a media content item (e.g., track) that is currently being played. The currently-playing media content item can be one of the media content items included in the currently-playing media context.

The current position-in-track information 1034 includes information about a current playback position of the media context. For example, the current position-in-track information 1034 includes a time (e.g., an elapsed time or progress time) that has elapsed since the beginning of playback of the media context. In other embodiments, the current position-in-track information 1034 includes a remaining time until the media context is complete to play. In other embodiments, the current position-in-track information 1034 can be configured for a particular media content item.

The playback control status information 1036 includes information that indicates whether the current media content item is currently being played or stopped (including paused).

The playback settings information 1038 include information about one or more settings of PMSA systems 110. Examples of the settings of PMSA systems 110 include preset information, playback settings, sound quality settings, notification settings, advertisement settings, and other settings for controlling operation of the PMSA systems 110 or media content playback via the PMSA systems 110.

The subsequent track information 1040 includes information about a media content item (e.g., track) that is to be played after the current media content item. In some embodiments, the subsequent track information 1040 identifies a single media content item. In other embodiments, the subsequent track information 1040 identifies a plurality of media content items in order.

The playback history information 1042 includes information about the media content items that have been played. In some embodiments, the playback history information 1042 can be provided as the playback history by each user account. In other embodiments, the playback history information 1042 can be provided as the playback history by each media playback device.

The various examples and teachings described above are provided by way of illustration only and should not be construed to limit the scope of the present disclosure. Those skilled in the art will readily recognize various modifications and changes that may be made without following the examples and applications illustrated and described herein, and without departing from the true spirit and scope of the present disclosure.

The invention claimed is:

1. A system for providing personalized media content to a personal media streaming appliance (PMSA), the system comprising:
a media delivery system comprising:
a media content server comprising:
a processing device,
a memory device, and
a media server application configured to provide a media streaming service; and
a personal media streaming appliance server comprising:
a processing device,
a memory device, and
a personal media streaming appliance configuration engine configured to:
store an identifier associated with a user media streaming account of a user and an identifier associated with a personal media streaming appliance in a table to link the user media streaming account to the personal media streaming appliance without user input that is received upon or after the PMSA's first use by the user;
automatically determine personalized content to provide to the personal media streaming appliance upon first use by the user;
automatically select one or more media contexts, wherein the personalized content matches the one or more media contexts; and
assign the one or more media contexts to a plurality of preset settings of the personal media streaming appliance before the PMSA's first use by the user.

2. The system of claim 1, wherein the media server application comprises user accounts data and taste profiles data for each of a plurality of users and the personal media streaming appliance configuration engine utilizes the taste profiles data for determining personalized content.

3. The system of claim 1, wherein the personal media streaming appliance configuration engine comprises an appliance provisioning engine configured to automatically assign media contexts to each of a plurality of preset buttons of the personal media streaming appliance, and a PMSA preset data store configured to store information regarding the assigned media contexts for each preset setting of the personal media streaming appliance.

4. The system of claim 3, wherein the personal media streaming appliance configuration engine receives an appliance identifier from a user computing device.

5. The system of claim 1, further comprising:
a personal media streaming appliance system comprising:
a user input device;
a media content output device; and
a memory device comprising an appliance setting configuration engine configured to receive personalized settings for outputting media content from the media delivery system.

6. The system of claim 5, wherein the personal media streaming appliance system comprises at least 3 preset buttons and the appliance provisioning engine assigns a unique context to each of the preset buttons, wherein each unique context is one of an album, an artist, a genre, a podcast, a radio station, an audiobook, and a playlist.

7. The system of claim 5, wherein the personal media streaming appliance system is configured to output media content personalized for the user account of the user upon first use by the user without receiving input from physical controls.

8. The system of claim 1, wherein:
the storing the identifier associated with the user media streaming account of the user and the identifier associated with the personal media streaming appliance comprises storing the identifier associated with the user media streaming account of the user and the identifier associated with the personal media streaming appliance before the user receives the PMSA from a vendor; and
the assigning the one or more media contexts to the plurality of preset settings of the PMSA comprises assigning the one or more media contexts to the plurality of preset settings of the PMSA before the user receives the PMSA from the vendor.

9. A method for providing personalized media content to a personal media streaming appliance, the method comprising the steps of:
providing, by a media content server executing a media server application, a media streaming service;
linking, by a personal media streaming appliance configuration engine, a user media streaming account of a user to a personal media streaming appliance without user input that is received upon or after the PMSA's first use by the user by storing an identifier associated with the user media streaming account and an identifier associated with the personal media streaming appliance in a table;
automatically determining personalized content to provide to a personal media streaming appliance upon first use by the user;
automatically selecting one or more media contexts, wherein the personalized content matches one or more media contexts; and
assigning the one or more media contexts to a plurality of preset settings of the personal media streaming appliance before the PMSA's first use by the user.

10. The method of claim 9, further comprising the steps of:
storing, by the media server application, user accounts data and taste profiles data for each of a plurality of users; and
determining, by the personal media streaming appliance configuration engine, personalized content based on the taste profiles data.

11. The method of claim 9, further comprising the steps of:
assigning, by an appliance provisioning engine, media contexts to each of the plurality of preset buttons of the personal media streaming appliance; and
storing, by a PMSA preset data store, information regarding the assigned media contexts for each preset setting of the personal media streaming appliance.

12. The method of claim 11, further comprising:
receiving, by the personal media streaming appliance configuration engine, an appliance identifier from a user computing device.

13. The method of claim 9, further comprising the step of:
receiving, by an appliance setting configuration engine, personalized settings for outputting media content from a media delivery system.

14. The method of claim 13, further comprising the step of:
assigning a unique context to each of at least 3 preset buttons of the personal media streaming appliance, wherein each unique context is one of an album, an artist, a genre, a podcast, a radio station, an audiobook, and a playlist.

15. The method of claim 13, further comprising the step of:
outputting media content personalized for the user account of the user upon first use without receiving input from physical controls.

16. The system of claim 9, wherein:
the storing the identifier associated with the user media streaming account of the user and the identifier associated with the personal media streaming appliance comprises storing the identifier associated with the user media streaming account of the user and the identifier associated with the personal media streaming appliance before the user receives the PMSA from a vendor; and
the assigning the one or more media contexts to the plurality of preset settings of the PMSA comprises assigning the one or more media contexts to the plurality of preset settings of the PMSA before the user receives the PMSA from the vendor.

17. A non-transitory computer-readable medium having stored thereon one or more sequences of instructions for causing one or more processors to perform:
providing, by a media content server executing a media server application, a media streaming service;
linking, by a personal media streaming appliance configuration engine, a user media streaming account of a user to a personal media streaming appliance without user input that is received upon or after the PMSA's first use by the user by storing an identifier associated with the user media streaming account of the user and an identifier associated with the personal media streaming appliance in a table;
automatically determining, without user input, personalized content to provide to the personal media streaming appliance upon first use;
automatically selecting one or more media contexts, wherein the personalized content matches one or more media contexts; and
assigning the one or more media contexts to a plurality of preset settings of the personal media streaming appliance before the PMSA's first use by the user.

18. The computer-readable medium of claim 17, further having stored thereon a sequence of instructions for causing the one or more processors to perform:
storing, by the media server application, user accounts data and taste profiles data for each of a plurality of users; and
determining, by the personal media streaming appliance configuration engine, personalized content based on the taste profiles data.

19. The computer-readable medium of claim 17, further having stored thereon a sequence of instructions for causing the one or more processors to perform:
assigning, by an appliance provisioning engine, media contexts to each of the plurality of preset buttons of the personal media streaming appliance; and
storing, by a PMSA preset data store, information regarding the assigned media contexts for each preset setting of the personal media streaming appliance.

20. The computer-readable medium of claim 19, further having stored thereon a sequence of instructions for causing the one or more processors to perform:
receiving, the personal media streaming appliance configuration engine, an appliance identifier from a user computing device.

21. The computer-readable medium of claim 17, further having stored thereon a sequence of instructions for causing the one or more processors to perform:
receiving, by an appliance setting configuration engine, personalized settings for outputting media content from a media delivery system.

22. The computer-readable medium of claim 21, further having stored thereon a sequence of instructions for causing the one or more processors to perform:
assigning a unique context to each of at least 3 preset buttons of the personal media streaming appliance, wherein each unique context is one of an album, an artist, a genre, a podcast, a radio station, an audiobook, and a playlist.

23. The computer-readable medium of claim 21, further having stored thereon a sequence of instructions for causing the one or more processors to perform:
outputting media content personalized for the user account of the user upon first use by the user without receiving input from physical controls.

24. The system of claim 17, wherein:
the storing the identifier associated with the user media streaming account of the user and the identifier associated with the personal media streaming appliance comprises storing the identifier associated with the user media streaming account of the user and the identifier associated with the personal media streaming appliance before the user receives the PMSA from a vendor; and
the assigning the one or more media contexts to the plurality of preset settings of the PMSA comprises assigning the one or more media contexts to the plurality of preset settings of the PMSA before the user receives the PMSA from the vendor.

* * * * *

UNITED STATES PATENT AND TRADEMARK OFFICE
CERTIFICATE OF CORRECTION

| | |
|---|---|
| PATENT NO. | : 11,483,200 B2 |
| APPLICATION NO. | : 16/397378 |
| DATED | : October 25, 2022 |
| INVENTOR(S) | : Nicklas Söderlind and Jimmy Wahlberg |

It is certified that error appears in the above-identified patent and that said Letters Patent is hereby corrected as shown below:

In the Specification

Under Cross-Reference to Related Applications
In Column 1, Line 9, "15/968,154" should read "15/958,154".

Signed and Sealed this
Seventh Day of February, 2023

Katherine Kelly Vidal
*Director of the United States Patent and Trademark Office*